(12) United States Patent
Yoo et al.

(10) Patent No.: US 12,742,900 B2
(45) Date of Patent: Sep. 22, 2026

(54) ROBUST LOW FREQUENCY SEISMIC BANDWIDTH EXTENSION VIA A DEEP NEURAL NETWORK TRAINED ON SYNTHETIC SEISMIC DATA

(71) Applicant: SAUDI ARABIAN OIL COMPANY, Dhahran (SA)

(72) Inventors: Jewoo Yoo, Delft (NL); Paul M. Zwartjes, Wassenaar (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 597 days.

(21) Appl. No.: 18/191,193

(22) Filed: Mar. 28, 2023

(65) Prior Publication Data

US 2024/0329266 A1 Oct. 3, 2024

(51) Int. Cl.

| | |
|---|---|
| ***G01V 1/30*** | (2006.01) |
| ***E21B 47/14*** | (2006.01) |
| ***G01V 1/28*** | (2006.01) |
| ***G01V 1/36*** | (2006.01) |

(52) U.S. Cl.
CPC .............. *G01V 1/303* (2013.01); *E21B 47/14* (2013.01); *G01V 1/282* (2013.01); *G01V 1/364* (2013.01); *E21B 2200/22* (2020.05)

(58) Field of Classification Search
None
See application file for complete search history.

(56) References Cited

U.S. PATENT DOCUMENTS

| | | | | |
|---|---|---|---|---|
| 10,191,168 | B2 | 1/2019 | Peng et al. | |
| 2019/0383965 | A1* | 12/2019 | Salman | G01V 1/36 |
| 2020/0183035 | A1* | 6/2020 | Liu | G06N 20/00 |
| 2021/0215841 | A1 | 7/2021 | Aharchaou et al. | |

(Continued)

OTHER PUBLICATIONS

Ovcharenko, Oleg, et al. "Multi-task learning for low-frequency extrapolation and elastic model building from seismic data." IEEE Transactions on Geoscience and Remote Sensing 60 (2022): 1-17. (Year: 2022).*

(Continued)

*Primary Examiner* — Raymond L Nimox
(74) *Attorney, Agent, or Firm* — Osha Bergman Watanabe & Burton LLP

(57) ABSTRACT

Systems and methods are disclosed. The method includes collecting a seismic dataset from a seismic survey and generating a plurality of synthetic datasets each including an input seismic dataset with a first bandwidth and an associated target seismic dataset with a second, broader, bandwidth, that includes lower frequencies than the first bandwidth. Each synthetic dataset is generated in a time domain and includes an event with a geometric shape and a wavelet. The method also includes splitting the plurality of synthetic datasets into a training set; selecting and training a first machine-learned model with a first architecture, to receive the seismic dataset and output another seismic dataset with extended bandwidth relative to the seismic dataset. The method further includes using the first machine-learned model to produce an extended bandwidth seismic dataset from the seismic dataset; and determining a location of a hydrocarbon reservoir using the extended bandwidth seismic dataset.

11 Claims, 19 Drawing Sheets

(56) References Cited

U.S. PATENT DOCUMENTS

2021/0318458 A1* 10/2021 Baumstein ............... G01V 1/36
2023/0408327 A1* 12/2023 Fu .......................... G01V 1/307

OTHER PUBLICATIONS

Yuan, Z., Jiang, et al., "Improving Seismic Resolution by a Sequential Convolutional Neural Network," 82nd EAGE Annual Conference & Exhibition, 2021 (6 pages).
Ronneberger, O., et al.,"U-Net: Convolutional Networks for Biomedical Image Segmentation," Medical Image Computing and Computer-Assisted Intervention, Lecture Notes in Computer Science, 2015 (8 pages).
Liang, C., et al., "Tutorial: Spectral bandwidth extension—Invention versus harmonic extrapolation," Geophysics 82, 2017 (65 pages).
Kingma, D. P., et al., "Adam: A method for stochastic optimization," International Conference on Learning Representations (ICLR), 2015 (15 pages).
Choi, Yonggyu, et al., "Vertical resolution enhancement of seismic data with convolutional U-net," SEG International Exposition and 89th Annual Meeting, 2019 (5 pages).
Halpert, A.D., et al., "Deep learning-enabled seismic image enhancement," SEG International Exposition and 88th Annual Meeting, 2018 (5 pages).
Li, Jintao, et al., "Deep learning for simultaneous seismic image super-resolution and denoising," Society of Exploration and Geophysicists, 2020 (5 pages).
Smith, Michael, et al., "Extending seismic bandwidth using the continuous wavelet transform," First Break, vol. 26, 2008 (6 pages).
J. Zhang, et al., "Well-Controlled Seismic Resolution Improvement: A Machine Learning Approach," 82nd Annual EAGE Conference & Exhibition, 2021 (5 pages).
Zwartjes, P., et al., "Robust high frequency seismic bandwidth extension with a deep neural network trained using synthetic data," Artificial Intelligence in Geosciences, 2024 (18 pages).
Non-Final Office Action issued in corresponding U.S. Appl. No. 18/191,183, mailed Jul. 29, 2025 (35 pages).

* cited by examiner

ROBUST LOW FREQUENCY SEISMIC BANDWIDTH EXTENSION VIA A DEEP NEURAL NETWORK TRAINED ON SYNTHETIC SEISMIC DATA

BACKGROUND

To understand and model a subterranean region of interest, especially in the field of oil and gas exploration, seismic experiments and/or surveys are often conducted. In a seismic survey, energy is emitted from a source, where the source is often on the surface of the Earth, into the subterranean region of interest. The emitted energy propagates as a wavefield through the subterranean region of interest and a portion of the propagating energy is reflected at geological interfaces joining regions of the subsurface with differing lithostratigraphic properties (i.e., regions of different rock types). Eventually, reflected wavefields return to the surface of the Earth and the amplitudes of these wavefields are recorded with respect to time by one or more seismic receivers. The collection of recorded amplitudes in time over one or more seismic receivers may be considered a seismic dataset. A seismic dataset may be organized, pre-processed, processed, and visualized as a seismic image. A seismic dataset (or seismic image) depicts subsurface reflectors, or geological interfaces, indicating changes in acoustic properties that usually coincide with changes in lithology in the subterranean region of interest. From the perspective of the frequency domain, seismic datasets are naturally bandlimited. The primary cause of this phenomenon in the seismic dataset is that the initial source wavefield and thus the recorded reflections have a limited temporal frequency bandwidth (or, more simply, bandwidth). As such, a seismic dataset does not depict the subsurface reflectors with a sharp contrast (i.e., a distinct interface) but as a wavelet with sidelobes (oscillations). Consequently, in practice, a seismic image may not accurately depict subsurface features and may be tainted with noise.

In order to reduce wavelet sidelobes, reduce sensitivity to noise-inducing scattering and absorption effects, and bridge the bandgap in impedance inversion, among other things, it is necessary to extend the bandwidth to include lower frequency content. That is, subsurface reflectors, and other geological features of the subsurface, are better interpreted with bandwidth-extended seismic datasets. Accordingly, to enhance subsurface models over a subterranean region of interest there exists a need to increase the bandwidth of acquired seismic datasets.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method. The method includes collecting a seismic dataset from a seismic survey conducted over a subterranean region of interest and generating a plurality of synthetic datasets, where each synthetic dataset includes an input seismic dataset with a first bandwidth and an associated target seismic dataset with a second bandwidth. The second bandwidth is broader, and includes lower frequencies, than the first bandwidth, and each synthetic dataset is generated directly in a time domain and includes an event composed of a geometric shape and a wavelet. The method includes splitting the plurality of synthetic datasets into a training set, selecting a first machine-learned model with a first architecture, training the first machine-learned model, using the training set, to receive the seismic dataset and output another seismic dataset with extended bandwidth relative to the seismic dataset. The method still further includes using the first machine-learned model to produce an extended bandwidth seismic dataset from the seismic dataset and determining a location of a hydrocarbon reservoir in the subterranean region of interest using the extended bandwidth seismic dataset.

In one aspect, embodiments disclosed herein relate to a method. The system includes a trained machine-learned model wherein the machine-learned model is trained to receive a seismic dataset and output another seismic dataset with extended bandwidth relative to the seismic dataset; and a computer configured to receive the seismic dataset, use the trained machine-learned model to produce an extended bandwidth seismic dataset from the seismic dataset, and construct a wellbore plan using the extended bandwidth seismic dataset. In one aspect, embodiments disclosed herein relate to a computer-implemented method of training a machine-learned model. The method includes generating a plurality of synthetic datasets, where each synthetic dataset is generated directly in a time domain and includes with a geometric shape and a wavelet, and where each synthetic dataset includes an input seismic dataset with a first bandwidth and an associated target seismic dataset with a second bandwidth. The second bandwidth is broader, by extending to lower frequencies, than the first bandwidth. The method includes splitting the plurality of synthetic datasets into a training set, selecting the machine-learned model type and architecture, training the machine-learned model using the training set, where the machine-learned model is trained to receive a seismic dataset and output another seismic dataset with extended bandwidth relative to the seismic dataset.

Other aspects and advantages of the claimed subject matter will be apparent from the following description and the appended claims.

DETAILED DESCRIPTION

Figure 1:
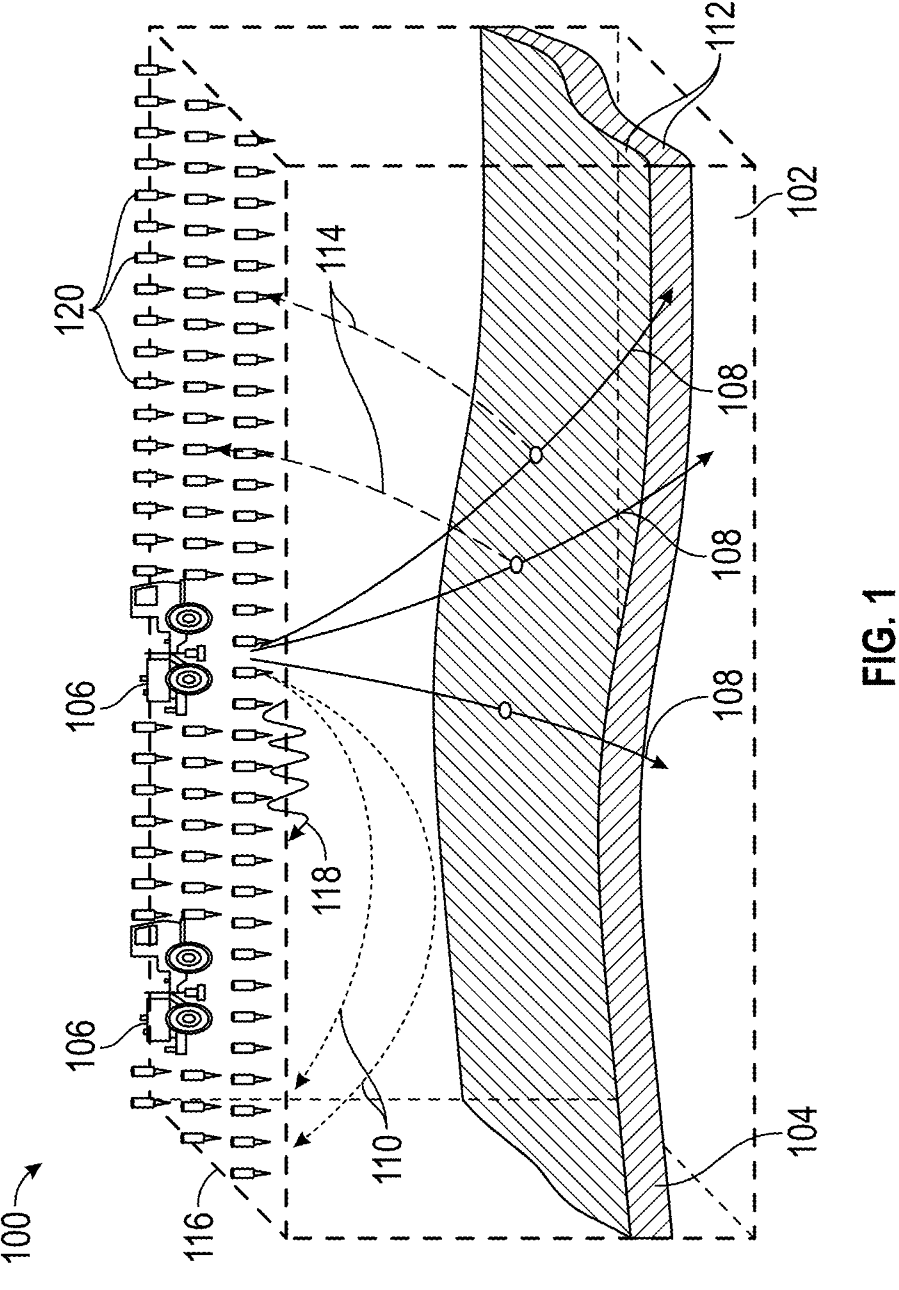
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-17, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108) (i.e., emitted energy, wavefield). The type of seismic source (106) may depend on the environment in which it is used, for example on land the seismic source (106) may be a vibroseis truck or an explosive charge, but in water the seismic source (106) may be an airgun. The radiated seismic waves (108) may return to the surface of the Earth (116) as refracted seismic waves (110) or may be reflected by geological discontinuities (112) (interfaces between subsurface regions with differing lithostratigraphic properties) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the surface of the Earth (116) and hence are not influenced, nor contain information about, portions of the subterranean region of interest (102) where hydrocarbon reservoirs (104) are typically located. Seismic receivers (120) located on or near the surface of the earth (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discrete sample times. Usually the origin of the time-series, denoted $t=0$, is determined by the activation time of the seismic source (106). This time-series may be denoted a seismic "trace". The seismic receivers (120) are positioned at a plurality of seismic receiver locations which we may denote with ($x_y$, $y_r$), where x and y represent orthogonal axes on the surface of the Earth (116) above the subterranean region of interest (102). Thus, the plurality of seismic traces generated by activations of the seismic source (106) at a single location may be represented as a three-dimensional "3D" volume with axes ($x_r$, $y_r$, t) where ($x_r$, $y_r$) represents the location of the seismic receiver (120) and t denotes the time sample at which the amplitude of ground-motion was measured. The collection of seismic traces is herein referred to as a seismic dataset.

However, a seismic survey (100) may include recordings of seismic waves generated by a seismic source (106) sequentially activated at a plurality of seismic source locations denoted ($x_s$, $y_s$). In some cases, a single seismic source (106) may be activated sequentially at each source location. In other cases, a plurality of seismic sources (106) each positioned at a different location may be activated sequentially. In accordance with one or more embodiments a plurality of seismic sources (106) may be activated during the same time period, or during overlapping time periods.

Once acquired, a seismic dataset may undergo a myriad of pre-processing steps. These pre-processing steps may include, but are not limited to, reducing signal noise; applying move-out corrections; organizing or resampling the traces according to a regular spatial pattern (i.e., regularization); and data visualization. One with ordinary skill in the art will recognize that many pre-processing (or processing) steps exist for dealing with a seismic dataset. As such, one with ordinary skill in the art will appreciate that not all pre-processing (or processing) steps can be enumerated herein and that zero or more pre-processing (or processing) steps may be applied with the methods disclosed herein without imposing a limitation on the instant disclosure.

Figure 2:
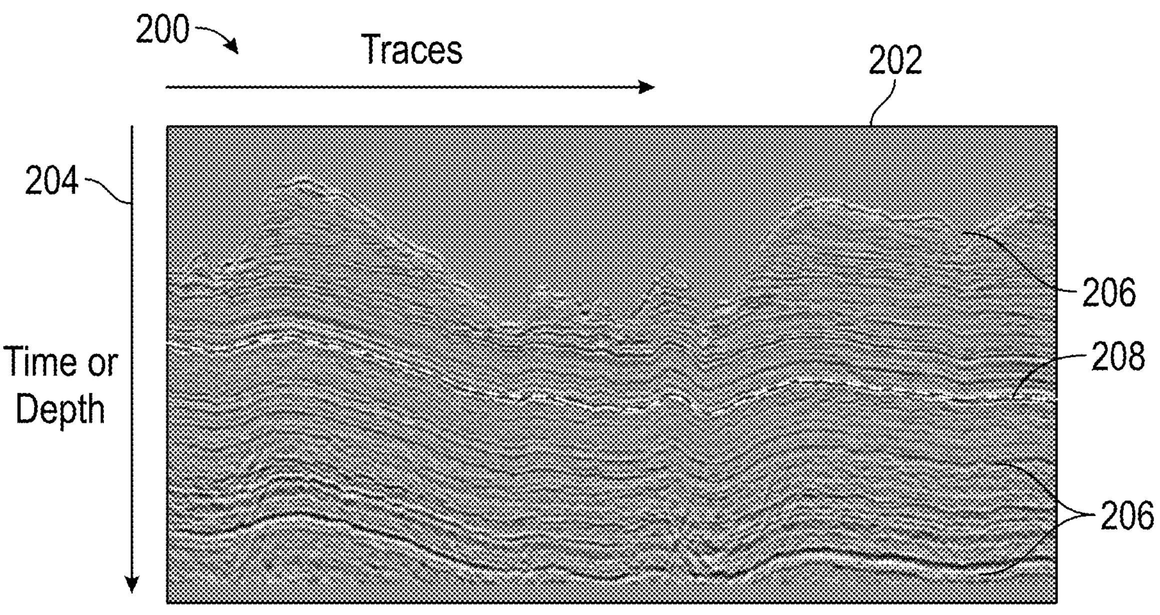
FIG. 2 depicts a seismic dataset in accordance with one or more embodiments.

FIG. 2 displays an example seismic dataset (200). The example seismic dataset (200) is shown as a seismic image where traces, indicating the reflection amplitude as a function of horizontal distance indicated on the horizontal axis (202) and depth or recorded in time indicated in the vertical axis (204), are arranged as columns and adjoined according to a spatial location on the surface of the Earth (116). Thus, the traces form the x-axis of the example seismic dataset (200). In accordance with one or more embodiments, the time axis of the traces may be converted to depth using one or more time-depth migration processes. As such, the y-axis of the example seismic dataset (200) may denote either time or depth. Many geological interfaces (206), or discontinuities, may be seen in FIG. 2. To prevent FIG. 2 from becoming cluttered only one geological interface (208) is indicated with a reference line. While major geological interfaces, such as geological interface (208) may be identified the conventional limited bandwidth seismic dataset (200), smaller subtler interfaces, particularly where reflections cross one another, or layer taper ("pinch-out") may be much more problematic to interpret.

It is noted that while FIG. 2 demonstrates a 2D example seismic dataset (200), this does not constitute a constraint on the dimensionality of a seismic dataset. In general, a seismic dataset may be 2D or 3D without departing from the scope of this disclosure.

Because a seismic dataset contains spatial and lithology information about the subterranean region of interest (102), the seismic dataset may be used to construct subsurface models of the subterranean region of interest (102). For example, the seismic dataset may be used to characterize and locate hydrocarbon reservoirs (104) and may be used to plan and drill a wellbore to extract said hydrocarbons. Further the seismic dataset and the subsurface models can inform oil and gas field planning and lifecycle management decisions. Thus, the quality of subsurface models, efforts to locate hydrocarbons, and well management decisions are all improved when the bandwidth of a seismic dataset is extended.

In one aspect, embodiments disclosed herein relate to a method to extend the bandwidth of a seismic dataset to include lower frequencies than originally present in the seismic dataset with machine learning (ML). Efforts to extend seismic datasets to include low frequency content have been previously explored in the literature, with some employing machine-learned techniques. However, the invention described herein is unique and represents substantial improvement over prior works in at least two regards. First, the method and system described herein extends the frequency content of a given seismic dataset to all low frequencies, whereas prior works are limited to a discrete subset of frequencies. Second, the method and system described herein uses synthetic training data constructed from wavelets with random bandwidth and geometric shapes, whereas prior works, if using synthetic data, generate synthetic training data through finite difference modeling with a single wavelet (i.e., data generated with a forward model or forward operator). Specifically, herein, synthetic seismic datasets are directly generated as a composition of geometric shapes and are not limited to a frequency range and are not reliant on a wavefield model (forward model, forward operator, etc.) or knowledge of subsurface parameters such as impedance (as may be required by a wavefield model). Consequently, a major improvement provided by the instant disclosure is that the trained machine-learned model produced herein is robust and capable of generalizing to new, unseen, and real seismic datasets as will be demonstrated below.

It is noted that while the methods and systems described herein will be described under the context of a seismic dataset like that shown in FIG. 2, these methods are not limited to these seismic datasets. In general, embodiments disclosed herein can be applied to any pre-stack and post-stack seismic data. For example, embodiments disclosed herein can be applied to a collection of shot gathers before or after migration and also to stacked seismic datasets that are obtained by the application of move-out corrections. In other words, one with ordinary skill in the art will appreciate that the methods disclosed herein are applicable to seismic datasets that have undergone any number of pre-processing (or processing) steps commonly employed in the art.

Figure 3:
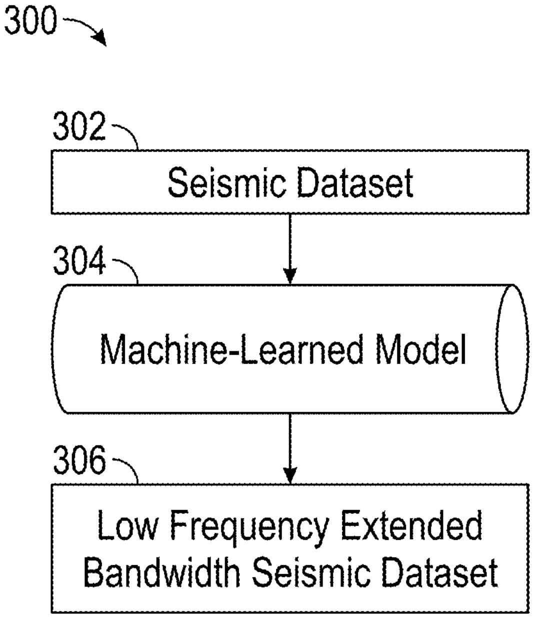
FIG. 3 depicts a workflow in accordance with one or more embodiments.

FIG. 3 depicts a high-level overview (300) of the seismic bandwidth extension process. First, a seismic dataset (302) is collected. The seismic dataset (302) may be acquired from a seismic survey (100). Further, the seismic dataset (302) may undergo any pre-processing (or processing) steps known in the art. The seismic dataset (302) is processed with a machine-learned model (304). The machine-learned model (304), and the data used to train it, will be described in greater detail later in the instant disclosure. However, for now, it is stated that the machine-learned model (304) is configured to receive the seismic dataset (302) and, upon processing, output another seismic dataset referred to herein as an extended bandwidth seismic dataset (306). The extended bandwidth seismic dataset (306) corresponds to the seismic dataset (302) but has an extended bandwidth relative to the seismic dataset (302). The term "extended" indicates that the range of frequencies spanned by the extended bandwidth seismic dataset (306) covers more frequencies than the seismic dataset (302). The extension is such that the extended bandwidth seismic dataset (306), if processed by a Fourier transform, contains low frequencies not present in the seismic dataset (302).

Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, random forests, and deep models such as neural networks, convolutional neural networks, and recurrent neural networks. Machine-learned model types, whether they are considered deep or not, are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. It is noted that in the context of machine learning (ML), the regularization of a machine-learned model refers to a penalty applied to the loss function of the machine-learned model and should not be confused with the regularization of a seismic dataset. Commonly, in the literature, the selection of hyperparameters surrounding a machine-learned model is referred to as selecting the model "architecture". Once a machine-learned model type and hyperparameters have been selected, the machine-learned model is trained to perform a task. In accordance with one or more embodiments, a machine-learned model type and associated architecture are selected, the machine-learned model is trained to extend the bandwidth of a given seismic dataset (302) to include lower frequencies, the performance of the machine-learned model is evaluated, and the machine-learned model is used in a production setting (also known as deployment of the machine-learned model).

As noted, the objective of the machine-learned model is to extend the bandwidth of a given seismic dataset (302) to include lower frequencies. In accordance with one or more embodiments, the selected machine-learned model (304) type is a convolutional neural network (CNN). A CNN may be more readily understood as a specialized neural network (NN). Thus, a cursory introduction to a NN and a CNN are provided herein. However, it is noted that many variations of a NN and CNN exist. Therefore, one with ordinary skill in the art will recognize that any variation of the NN or CNN (or any other machine-learned model) may be employed without departing from the scope of this disclosure. Further, it is emphasized that the following discussions of a NN and a CNN are basic summaries and should not be considered limiting.

Figure 4:
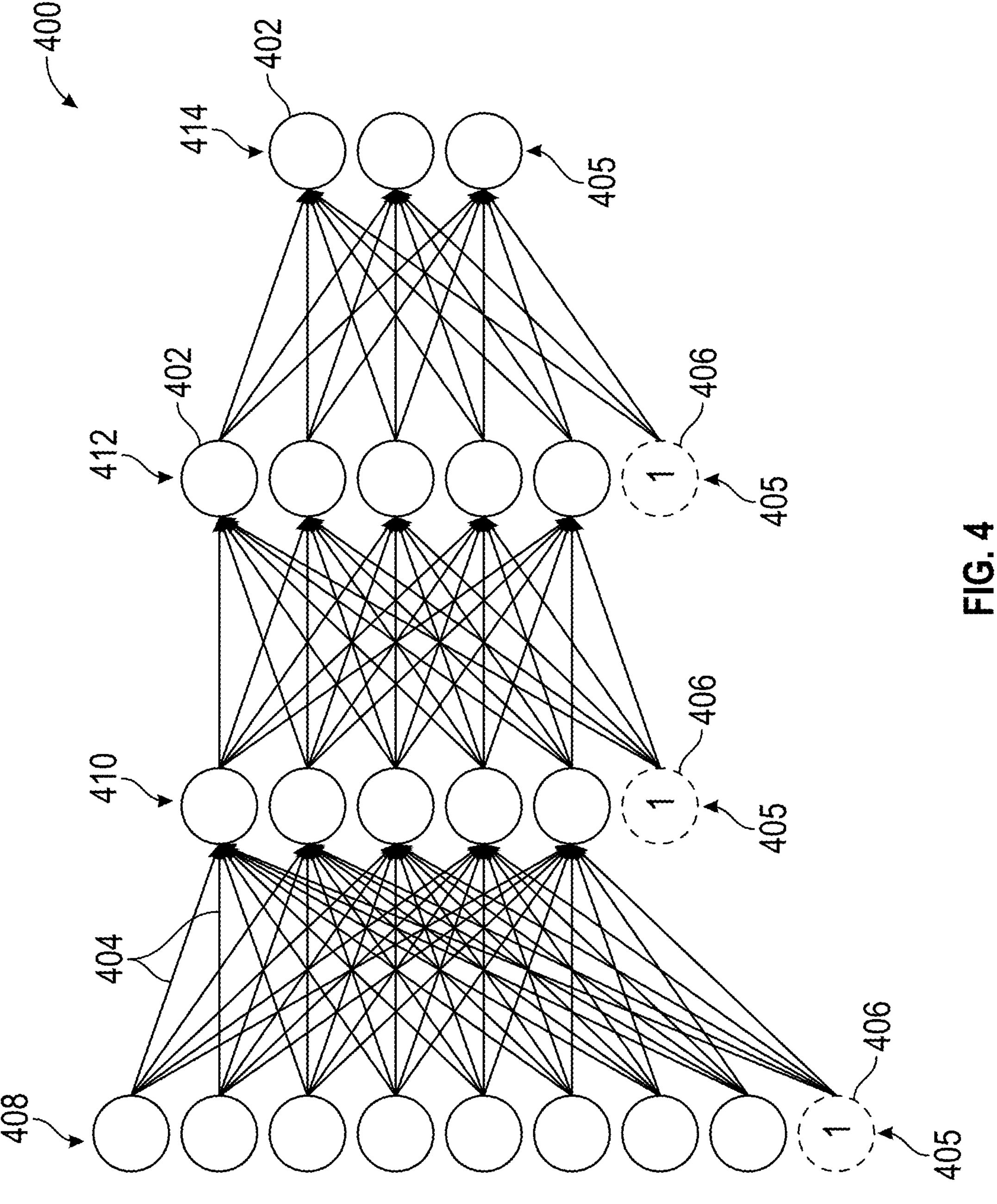
FIG. 4 depicts a neural network in accordance with one or more embodiments.

A diagram of a neural network is shown in FIG. 4. At a high level, a neural network (400) may be graphically depicted as being composed of nodes (402), where here any circle represents a node, and edges (404), shown here as directed lines. The nodes (402) may be grouped to form layers (405). FIG. 4 displays four layers (408, 410, 412, 414) of nodes (402) where the nodes (402) are grouped into columns, however, the grouping need not be as shown in FIG. 4. The edges (404) connect the nodes (402). Edges (404) may connect, or not connect, to any node(s) (402) regardless of which layer (405) the node(s) (402) is in. That is, the nodes (402) may be sparsely and residually connected. A neural network (400) will have at least two layers (405), where the first layer (408) is considered the "input layer" and the last layer (414) is the "output layer". Any intermediate layer (410, 412) is usually described as a "hidden layer". A neural network (400) may have zero or more hidden layers (410, 412) and a neural network (400) with at least one hidden layer (410, 412) may be described as a "deep" neural network or as a "deep learning method". In general, a neural network (400) may have more than one node (402) in the output layer (414). In this case the neural network (400) may be referred to as a "multi-target" or "multi-output" network.

Nodes (402) and edges (404) carry additional associations. Namely, every edge is associated with a numerical value. The edge numerical values, or even the edges (404) themselves, are often referred to as "weights" or "parameters". While training a neural network (400), numerical values are assigned to each edge (404). Additionally, every node (402) is associated with a numerical variable and an activation function. Activation functions are not limited to any functional class, but traditionally follow the form $$A = f\left(\sum_{i \in (incoming)} [(\text{node value})_i (\text{edge value})_i]\right), \quad \text{EQ 1}$$

where i is an index that spans the set of "incoming" nodes (402) and edges (404) and f is a user-defined function. Incoming nodes (402) are those that, when viewed as a graph (as in FIG. 4), have directed arrows that point to the node (402) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (402) in a neural network (400) may have a different associated activation function. Often, as a shorthand, activation functions are described by the function $f$ by which it is composed. That is, an activation function composed of a linear function $f$ may simply be referred to as a linear activation function without undue ambiguity.

When the neural network (400) receives an input, the input is propagated through the network according to the activation functions and incoming node (402) values and edge (404) values to compute a value for each node (402). That is, the numerical value for each node (402) may change for each received input. Occasionally, nodes (402) are assigned fixed numerical values, such as the value of 1, that are not affected by the input or altered according to edge (404) values and activation functions. Fixed nodes (402) are often referred to as "biases" or "bias nodes" (406), displayed in FIG. 4 with a dashed circle.

In some implementations, the neural network (400) may contain specialized layers (405), such as a normalization layer, or additional connection procedures, like concatenation. One skilled in the art will appreciate that these alterations do not exceed the scope of this disclosure.

As noted, the training procedure for the neural network (400) comprises assigning values to the edges (404). To begin training the edges (404) are assigned initial values. These values may be assigned randomly, assigned according to a prescribed distribution, assigned manually, or by some other assignment mechanism. Once edge (404) values have been initialized, the neural network (400) may act as a function, such that it may receive inputs and produce an output. As such, at least one input is propagated through the neural network (400) to produce an output. Training data is provided to the neural network (400). Generally, training data consists of pairs of inputs and associated targets. The targets represent the "ground truth", or the otherwise desired output, upon processing the inputs. In the context of the instant disclosure, an input is a seismic dataset and its associated target is a bandwidth extended seismic dataset. During training, the neural network (400) processes at least one input from the training data and produces at least one output. Each neural network (400) output is compared to its associated input data target. The comparison of the neural network (400) output to the target is typically performed by a so-called "loss function"; although other names for this comparison function such as "error function", "misfit function", and "cost function" are commonly employed. Many types of loss functions are available, such as the mean-squared-error function, however, the general characteristic of a loss function is that the loss function provides a numerical evaluation of the similarity between the neural network (400) output and the associated target. The loss function may also be constructed to impose additional constraints on the values assumed by the edges (404), for example, by adding a penalty term, which may be physics-based, or a regularization term (not be confused with regularization of seismic data). Generally, the goal of a training procedure is to alter the edge (404) values to promote similarity between the neural network (400) output and associated target over the training data. Thus, the loss function is used to guide changes made to the edge (404) values, typically through a process called "backpropagation".

While a full review of the backpropagation process exceeds the scope of this disclosure, a brief summary is provided. Backpropagation consists of computing the gradient of the loss function over the edge (404) values. The gradient indicates the direction of change in the edge (404) values that results in the greatest change to the loss function. Because the gradient is local to the current edge (404) values, the edge (404) values are typically updated by a "step" in the direction indicated by the gradient. The step size is often referred to as the "learning rate" and need not remain fixed during the training process. Additionally, the step size and direction may be informed by previously seen edge (404) values or previously computed gradients. Such methods for determining the step direction are usually referred to as "momentum" based methods.

Once the edge (404) values have been updated, or altered from their initial values, through a backpropagation step, the neural network (400) will likely produce different outputs. Thus, the procedure of propagating at least one input through the neural network (400), comparing the neural network (400) output with the associated target with a loss function, computing the gradient of the loss function with respect to the edge (404) values, and updating the edge (404) values with a step guided by the gradient, is repeated until a termination criterion is reached. Common termination criteria are: reaching a fixed number of edge (404) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (404) values are no longer intended to be altered, the neural network (400) is said to be "trained."

A CNN is similar to a neural network (400) in that it can technically be graphically represented by a series of edges (404) and nodes (402) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Images have such a structural relationship. A seismic dataset may be organized and visualized as an image. Consequently, a CNN is an intuitive choice for processing a seismic dataset.

A structural grouping, or group, of weights is herein referred to as a "filter". The number of weights in a filter is typically much less than the number of inputs, where here the number of inputs refers to the number of pixels in an image or the number of trace-time (or trace-depth) values in a seismic dataset. In a CNN, the filters can be thought as "sliding" over, or convolving with, the inputs to form an intermediate output or intermediate representation of the inputs which still possesses a structural relationship. Like unto the neural network (400), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. In some instances, the structural relationship of the final intermediate representations is ablated; a process known as "flattening". The flattened representation may be passed to a neural network (400) to produce a final output. Note, that in this context, the neural network (400) is still considered part of the CNN. Like unto a neural network (400), a CNN is trained, after initialization of the filter weights, and the edge (404) values of the internal neural network (400), if present, with the backpropagation process in accordance with a loss function.

Figure 5:
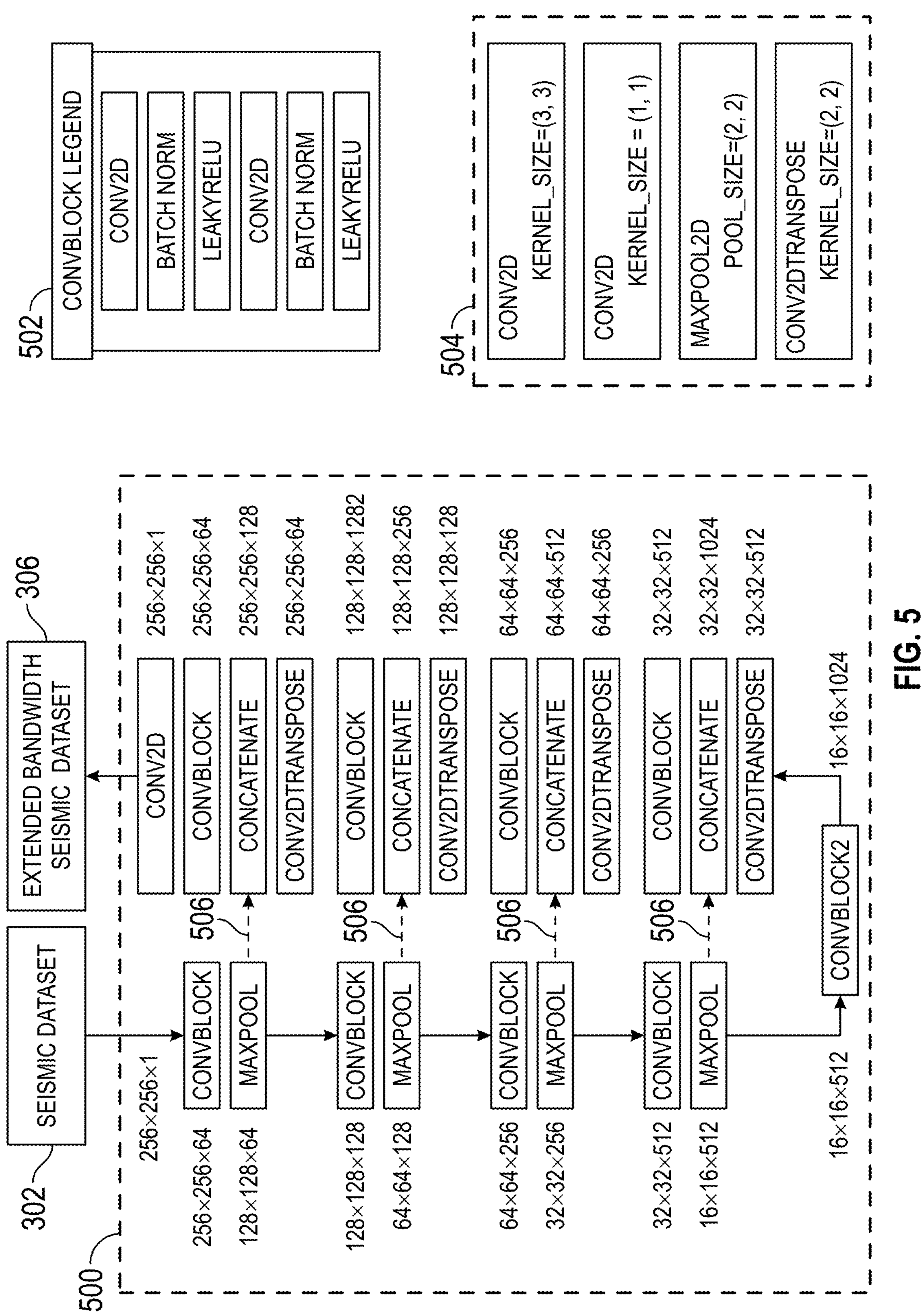
FIG. 5 depicts a convolutional neural network in accordance with one or more embodiments.

In accordance with one or more embodiments, the architecture of the CNN (500) is depicted in FIG. 5. The CNN (500) accepts a seismic dataset (302) as an input. The CNN (500) processes the seismic dataset (302) with a series of convolutional blocks, pooling operations, transpose (or upsampling) operations, and concatenations. The components of a convolutional block, in accordance with the CNN (500) architecture depicted in FIG. 5, are shown in the ConvBlock legend (502). As shown, each convolutional block consists of a 2-dimensional convolution operation, followed by a batch normalization operation, followed by a leaky ReLu activation function, repeated two times. In accordance with one or more embodiments, FIG. 5 also depicts the values of CNN hyperparameters (504) governing the CNN (500). The depicted CNN hyperparameters (504) indicate the size of the convolution kernel used in the convolutions of the CNN (500), the size of the max pooling kernel, and the size of the transpose kernel, in accordance with one or more embodiments. The CNN hyperparameters (504) may be selected by a user or may be identified during training using a set of data similar to the training data known as a validation set. Additionally, FIG. 5 illustrates the relative size of the data throughout the operations of the CNN (500). In the example of FIG. 5, the seismic dataset consist of 256 traces and each trace has 256 discrete time samples. The size of the data as it is processed by the CNN (500) is dependent on the size of the input seismic dataset. As such, the relative data sizes depicted in FIG. 5 are given with respect to a seismic dataset with 256 traces each with 256 time samples, however, one with ordinary skill in the art will recognize that the CNN (500) of FIG. 5 is not limited to this size of input. In general, the CNN (500) of FIG. 5 can accept an input of almost any size so long as the convolutional operations and max pooling operations do not reduce the intermediate data below the defined kernel sizes of these operations, respectively. Using this example input size of 256 traces each with 256 time samples and the kernel sizes given in the CNN hyperparameters (504), the first convolutional block of the CNN does not reduce the size of the input (indicating padding is used during the convolution operations) and generates 64 intermediate representations. Each of these intermediate representations are then processed by a max pooling operation which reduces the intermediate data size to 128 by 128 by 64. The intermediate data is both retained for later use (as a copy) and passed on to additional operations. Specifically, the intermediate data is processed by three more sets of convolutional blocks and max pooling operations, where a copy of the intermediate data is again retained after each max pooling operation, until the intermediate data is of the size 16 by 16 by 512. A convolutional block is then applied to double the number of intermediate representations, each of size 16 by 16. The CNN (500) then applies a transpose operation which effectively increases, or upsamples, the size of the intermediate data. In the example of FIG. 5, after the first transpose operation, the size of each intermediate representation in the intermediate data is increased from 16 by 16 to 32 by 32, or doubled in each dimension, due to the kernel size of the transpose operations being set to (2, 2). After transposition, the intermediate data is concatenated with a previously retained copy of the intermediate data from a previous operation. In the literature the connection of retained data from previous portions of the CNN (500) to the data post transposition (or upsampling) is often referred to as a skip connection (506). After concatenation, a convolutional block is applied to the concatenated data. This process of transposition, concatenation with a previous copy of intermediate data as demonstrated by the skip connections (506), and application of a convolutional block is applied three times. The result of this process is that each intermediate representation now has the same size as the initial input. The intermediate representations are then processed with a special convolutional operation with a kernel size of (1, 1). This effectively collapses the intermediate representations to produce the output, or extended bandwidth seismic dataset (306), with the same size as the original seismic dataset (302). Therefore, if trained correctly, the CNN (500) of FIG. 5 is configured to accept a seismic dataset (302) and return an extended bandwidth seismic dataset (306), where the extended bandwidth seismic dataset (302) is the same size as the seismic dataset (302) but now includes low frequency content.

While an embodiment using a CNN (500) for the machine-learned model type has been described above, one skilled in the art will appreciate that the instant disclosure is not limited to this machine-learned model type. Machine-learned models such as a random forest, visual transformers (ViTs), or non-parametric methods such as K-nearest neighbors or a Gaussian process may be readily inserted into this framework and do not depart from the scope of this disclosure.

To train the machine-learned model (304) (e.g., the CNN (500)), training data must be provided. Commonly, in the literature, training data is collected from a variety of seismic surveys and/or synthetically generated through a modeling process. When training data is collected from seismic surveys, typically, the collected seismic dataset is considered the extended bandwidth seismic dataset and this dataset is processed with a bandpass filter in the frequency domain to effectively reduce its bandwidth. That is, in the case of data collection from seismic surveys, the seismic datasets (or inputs) used in training are frequency truncated versions of the originally acquired seismic datasets. In the case of generating synthetic seismic datasets for training data, a modeling process is used. Generally, the modeling processes require prior knowledge about the subterranean region of interest (102), such as the knowledge about geology, geophysics, and petrophysics. For example, a velocity model of the subterranean region of interest (102) may be required. A velocity model can be represented as $$m = m(x), \quad \text{EQ 2}$$

Where x represents a spatial coordinate, such as a location in a subterranean region of interest (102) defined by an x-axis coordinate, a y-axis coordinate, and a depth, d, (e.g., (x,y,d)), and m is a vector indicating the directional velocities at the spatial coordinate x. In some implementations, the subterranean region of interest (102) may be isotropic such that the velocity m at a spatial coordinate may be represented as a scalar. With prior knowledge, such as the velocity model, a forward modeling process may be used to simulate the propagation of a seismic wave from one or more seismic sources (106) to one or more simulated seismic receivers (120).

To model the wave propagation, the forward modeling process requires a governing equation such as, for example, the generalized wave equation. The forward modeling process may employ a finite difference method to solve the following expression of the wave equation:

$$\left(s\frac{\partial^2}{\partial t^2} - \nabla^2\right)p(x, t; x_s) = f(t)\delta(x - x_s). \quad \text{EQ 3}$$

In EQ. 3, s is the square of the reciprocal of velocity at spatial coordinate x as given by a supplied velocity model m, $\nabla^2$ is the Laplacian operator, p represents the seismic wave wavefield, $x_s$ is the spatial coordinate for a seismic source (106), and $f(t)$ is the signature of the seismic source (106) (e.g., a Ricker wavelet). Thus, a seismic dataset can be simulated at an arbitrary seismic receiver (120) location $x_s$.

Both methods of acquiring training data-collecting real seismic datasets from seismic surveys and generating synthetic seismic data sets through a modeling process—possess significant disadvantages. In general, collecting training data through many seismic surveys is a costly process. Further, the bandwidth of the targets (i.e., the desired output) is limited to the bandwidth of the seismic survey. Finally, real seismic datasets are restricted to the subsurface features present in the associated region. Consequently, machine-learned models trained using the real seismic datasets do not generalize well to seismic datasets from regions with different subsurface features. That is, machine-learned models trained with real seismic datasets become significantly inaccurate when processing seismic data from a subterranean region of interest (102) which is geologically dissimilar from that used in training. Synthetic seismic datasets, generated from a modeling process, are dependent on some prior knowledge of the subterranean region of interest (102) and the prior knowledge may be inaccurate leading to poor synthetic seismic datasets. Further, synthetic datasets generated through these modeling processes are known to have differences in the character of both signal and noise from real seismic datasets making machine-learned models trained with these synthetic seismic datasets unable to generalize to real seismic data.

In contrast, in one or more embodiments of the instant disclosure, synthetic training data is generated directly in a time domain with geometric shapes. Training data generated in this manner is not limited to any range of frequencies, can cover a broad range of geological features, and can mimic real seismic datasets in terms of signal and noise character.

Figure 6A:
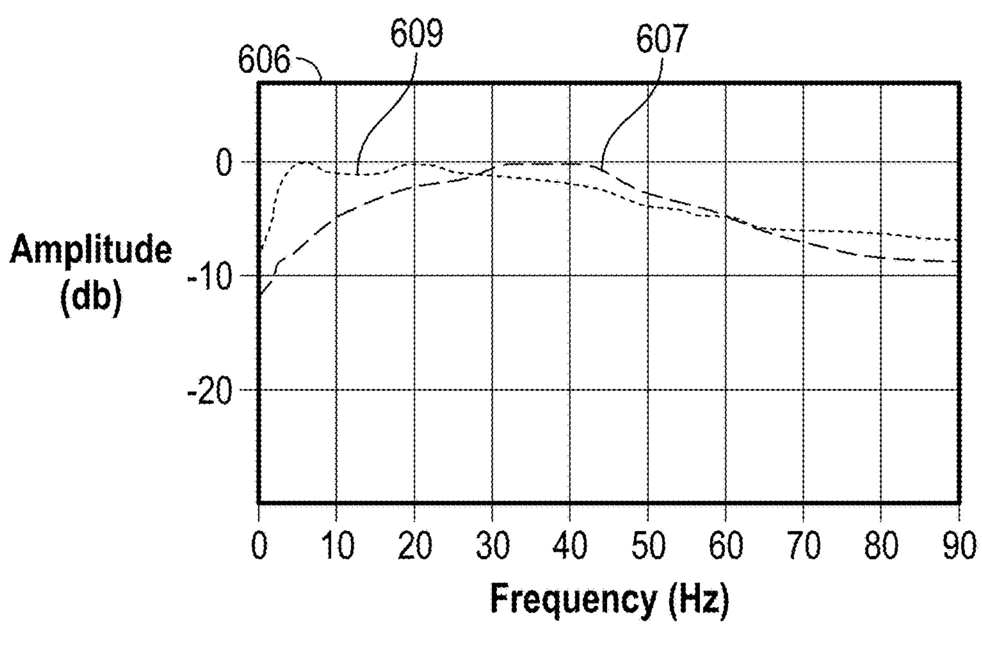
FIG. 6A depicts an example synthetic dataset in accordance with one or more embodiments.
Figure 6A:
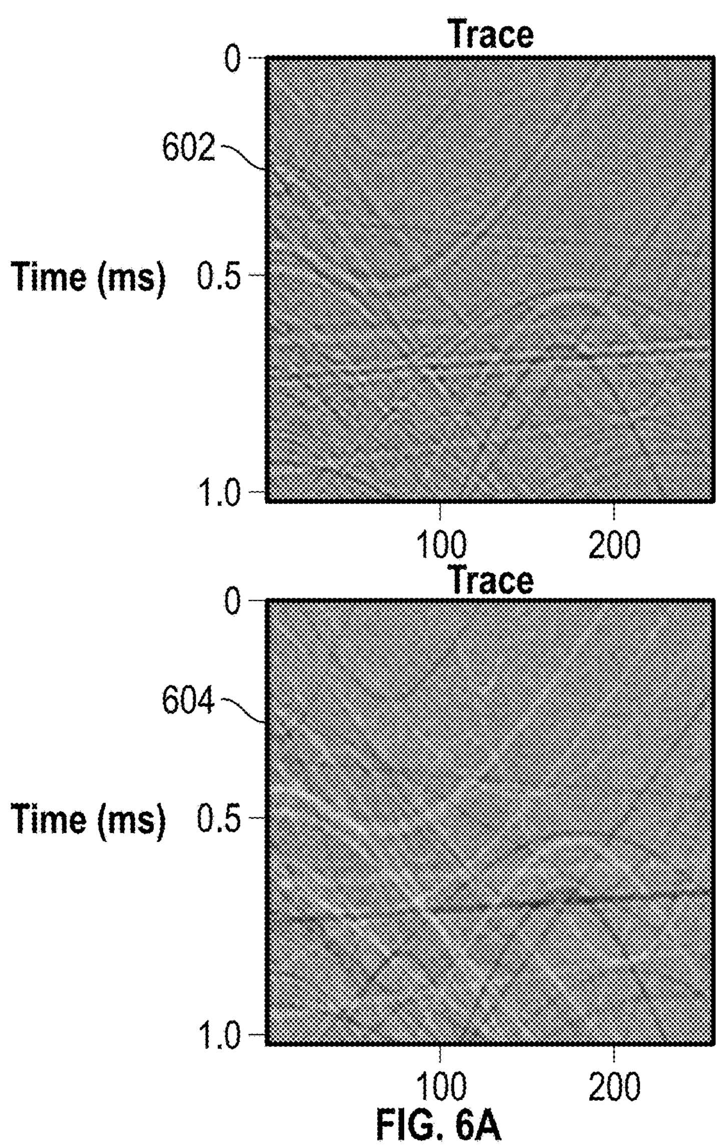
Figure 6B:
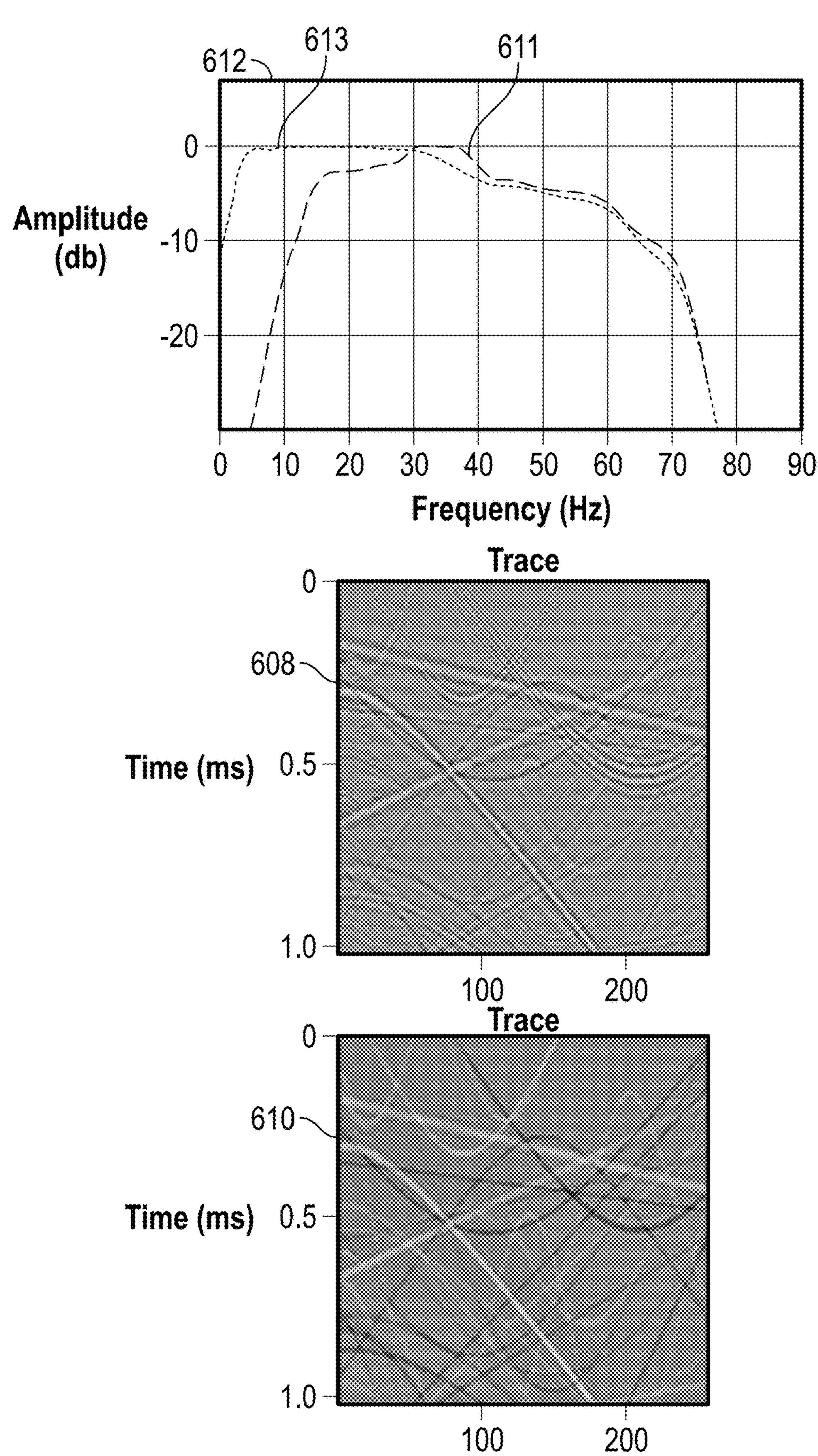
FIG. 6B depicts an example synthetic dataset in accordance with one or more embodiments.

FIGS. 6A and 6B depict example synthetic seismic datasets generated using geometric shapes. In accordance with one or more embodiments, the training data for the machine-learned model is composed of many synthetic seismic datasets where each synthetic seismic dataset includes both an input seismic dataset and a target seismic dataset. Further, for a given synthetic seismic dataset, the input seismic dataset may be referred to as a narrow bandwidth seismic dataset and the associated target seismic dataset may be referred to as a broad bandwidth seismic dataset where the bandwidth of the broad bandwidth seismic dataset is extended to contain low frequencies not present in the narrow bandwidth seismic dataset. That is, a synthetic dataset includes a narrow bandwidth seismic dataset and an associated broad bandwidth seismic dataset (i.e., an input-target pair). A plurality of synthetic datasets may be used to train the machine-learned model (304). FIG. 6A depicts a first example of a synthetic dataset. As seen in FIG. 6A, the first example synthetic dataset consists of a first example input seismic dataset (602) and a first example target seismic dataset (604). The first example input seismic dataset (602) and the first example target seismic dataset (604) are composed of the same geometric shapes formed directly in the time domain (in other embodiments, geometric shapes may be formed in the distance, or length, domain). The process of generating the synthetic datasets using geometric shapes directly in the time (or spatial) domain is described in greater detail below. However, for now, it is emphasized that the first example target seismic dataset (604), when viewed from a frequency perspective (e.g., after processing with a Fourier transform) contains lower frequencies (or lower frequencies with increased amplitude) than the first example input seismic dataset (602). This is verified by plotting the amplitude of the frequency spectrum for the first example input seismic dataset (602) and the first example target seismic dataset (604) in the first example frequency plot (606). The first example frequency plot (606) in FIG. 6A depicts a first line (607) that indicates the amplitude versus frequency for the frequency spectrum of the first example input seismic dataset (602). Similarly, the first example frequency plot (606) depicts a second line (609) that indicates the amplitude versus frequency for the frequency spectrum of the first example target seismic dataset (604). As seen in the first example frequency plot (606) of FIG. 6A, the frequency content of the first example target seismic dataset (604) contains increased frequency content at lower frequencies than its associated first example input seismic dataset (602).

As another example, FIG. 6B depicts a second example of a synthetic dataset. As seen in FIG. 6B, the second example synthetic dataset consists of a second example input seismic dataset (608) and a second example target seismic dataset (610). As before, the second example target seismic dataset (610), when viewed from a frequency perspective contains lower frequencies (or lower frequencies with increased amplitude) than the second example input seismic dataset (608). This is verified in the second example frequency plot (612) of FIG. 6B which depicts a third line (611) and a fourth line (613). The third line (611) indicates the amplitude versus frequency for the frequency spectrum of the second example input seismic dataset (608). The fourth line (613) indicates the amplitude versus frequency for the frequency spectrum of the second example target seismic dataset (610). As seen in the second example frequency plot (612) of FIG. 6B, the frequency content of the second example target seismic dataset (610) contains increased frequency content at lower frequencies than its associated second example input seismic dataset (608).

Figure 7:
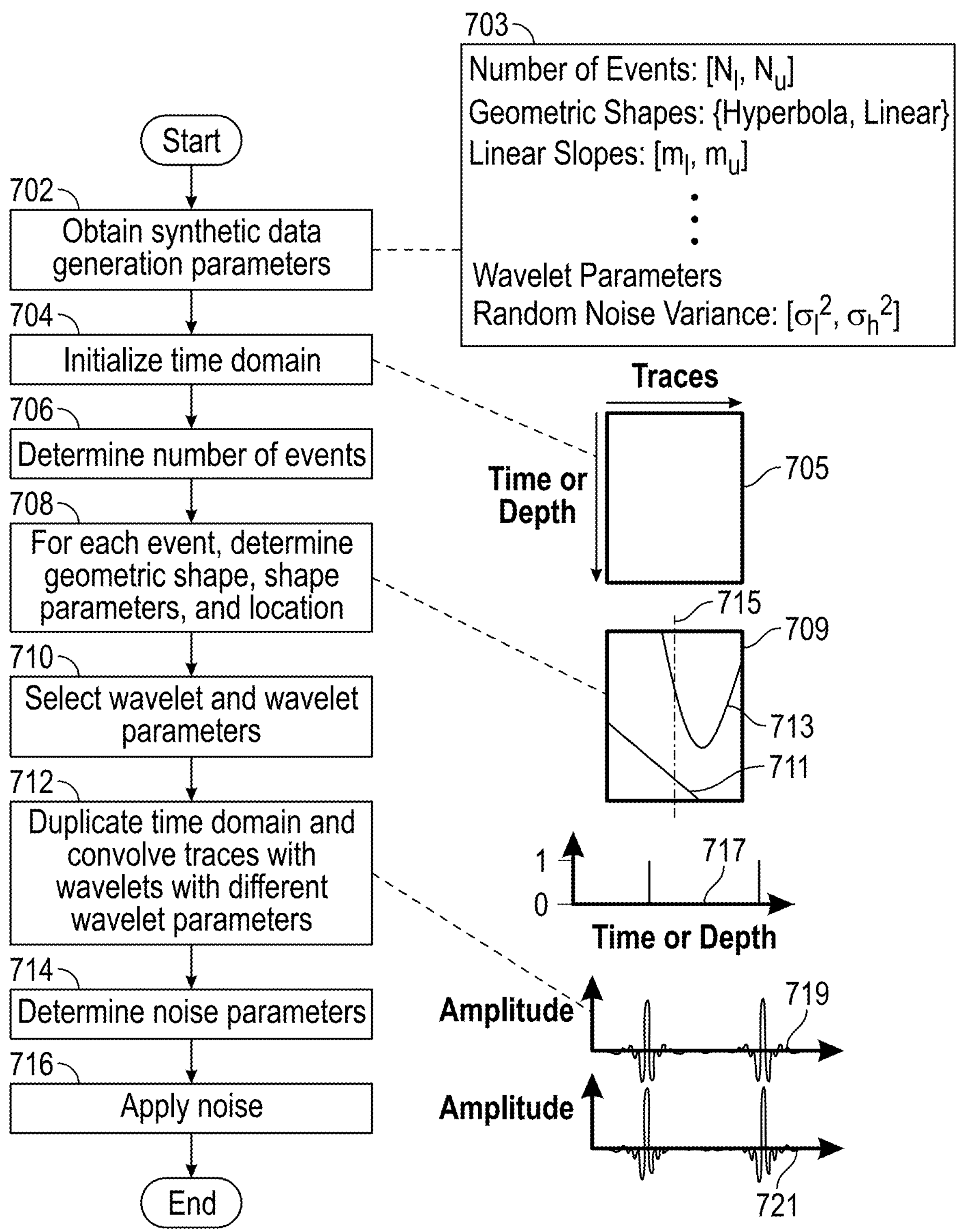
FIG. 7 depicts a synthetic data generation process in accordance with one or more embodiments.

In accordance with one or more embodiments, FIG. 7 depicts a flowchart outlining this synthetic dataset generation process along with graphical illustrates of select steps to provide greater clarity. As seen in FIG. 7, in Block 702, user-supplied synthetic data generation parameters are obtained. The synthetic data generation parameters control aspects of the synthetic data generation process. Examples of synthetic data generation parameters (703) are shown. To create a synthetic dataset, parameters such as the number of events and the available geometric shapes that describe each event must be defined. In accordance with one or more embodiments, the synthetic data generation parameters (703) are defined, by a user, as ranges or sets, where, for a given seismic dataset, a value is selected by random from within the range or set. For example, a user may prescribe a lower and upper bound for the number of events in a synthetic dataset. The lower and upper bound for the number of events are symbolized as Nl and Ny in FIG. 7, respectively. For each event, a geometric shape must be chosen. Therefore, the synthetic data generation parameters (703) also describe a set of available shapes, such as a hyperbola or linear line, as well as ranges or sets for any parameters required to describe the shape. For example, in the case that for an event a linear line is selected as the geometric shape, the synthetic data generation parameters (703) define a range for acceptable linear slopes (lower bound $m_l$ and upper bound $m_u$) and a method for selecting the location of the linear slope (not shown).

In accordance with one or more embodiments, the synthetic data generation parameters (703) also include a set of wavelets, where for a given event or for a given synthetic dataset, the randomly selected seismic wavelet is convolved with the event or traces of the synthetic dataset (to be described in greater detail below). To train the machine-learned model to extend the frequency content of a given seismic data set, the choice of wavelet is important and will be discussed in greater detail below. For now, it is sufficient to say that wavelets available for selection and/or use may include, but are not limited to: Ormsby; Klauder; Butterworth; and Gaussian. As such, in one or more embodiments, the synthetic data generation parameters (703) define a set of available wavelets for use and a method of selecting a wavelet from the set. In one or more embodiments, a wavelet is selected from the set according to a probability distribution defined by the synthetic data generation parameters (703). Further, the synthetic data generation parameters (703) include a range, or other method, for defining any adjustable features of the wavelet (i.e., wavelet parameters) and one or more methods for injecting noise into the synthetic dataset. For concision, not all synthetic data generation parameters (703) are enumerated in FIG. 7. However, one with ordinary skill in the art will recognize that many alterations to the synthetic dataset generation process of FIG. 7 can be made without departing from the scope of this disclosure and that these alterations may necessitate fewer or additional synthetic data generation parameters (703).

Keeping with FIG. 7, in Block 704, for a synthetic dataset, the time domain (or spatial domain) of the synthetic dataset is initialized. The time domain of the synthetic dataset is a collection of traces organized according to their simulated location and aligned according to time (or depth when using a spatial domain). In accordance with one or more embodiments, the time domain is initialized such that all the traces have a value of zero for every time or depth. In other embodiments, the time domain is initialized so that the values of the traces have random values. It is noted that the time domain may be discrete or continuous. In the case that the time domain is continuous, it may be discretized once the synthetic dataset is completed. Again, while the term time domain is used, the domain may also be spatial according to depth where time and depth may be interchanged according to a time-depth transformation function. An initialized time domain (705) is shown in FIG. 7.

In Block 707 of FIG. 7, once a time domain (705) for a synthetic dataset has been initialized, the number of events to be inserted into the time domain is determined. In accordance with one or more embodiments, in step 706, the number of events to be inserted into the time domain for the synthetic dataset is randomly selected from within a range defined by the synthetic data generation parameters (703). For example, the synthetic data generation parameters may define a lower bound and an upper bound the for the number of events that can be used when generating a synthetic dataset as $N_l$ and $N_u$, respectively, where $N_l$ and $N_u$ are integers and $0<N_l\leq N_u$. In this case, the number of events is determined by randomly selecting a number greater than or equal to $N_l$ and less than or equal to $N_u$. In one or more embodiments, the probability of selecting a number of events within a user-provided range need not be uniform across the range. In this case, the user also specifies the probability distribution for the available number of events that can be selected as part of the synthetic data generation parameters (703). In one or more embodiments, the probability distribution may indicate a 100% probability of selecting a given number of events and a 0% probability of selecting any other numbers in the number of events range or set. That is, in one or more embodiments, the number of events may be a fixed number that is applied to all generated synthetic seismic datasets.

For a synthetic dataset, once the number of events has been determined, for each event a geometric shape is determined as shown in Block 708. In one or more embodiments, the geometric shape of an event is randomly selected from a set of geometric shapes provided in the user-defined synthetic data generation parameters (703). For example, the synthetic data generation parameters (703) may define the geometric shapes of a hyperbola (or hyperbolic line) and a linear line as available geometric shapes. Further, the user may indicate the probability that any geometric shape in the set of geometric shapes is selected. In Block 708, once a geometric shape is selected, its location and shape parameters are also determined. The shape parameters encompass any additional information required to sufficiently describe the geometric shape. For example, in the case where a linear line is selected for an event, the shape parameters include, at least, the slope of the linear line. The method for determining the shape parameters of a geometric shape is defined by the synthetic data generation parameters (703). For example, in one or more embodiments, a range of suitable linear slopes is bounded by a lower bound, $m_l$, and an upper bound, $m_u$, where the lower and upper bounds of suitable slopes are provided by the user in the synthetic data generation parameters (703). In one or more embodiments, when an event is determined be a linear line, the slope of the linear line for that event is randomly selected from within the range defined by the slope lower bound, $m_u$, and the slope upper bound, $m_u$, according to a user-provided probability distribution (e.g., a uniform distribution). In the case where an event is determined to be a hyperbola (i.e., hyperbolic line), shape parameters specific to the hyperbola, and the method by which they are selected, are determined according to the synthetic data generation parameters (703). Further, in Block 708, the location where the geometric shape is placed within the time domain (705) is determined. The possible placement locations, and the method of selecting a location, are defined in the synthetic data generation parameters (703). For example, in one or more embodiments, for an event that has been determined to be a linear line, the intercept of the line with the time or depth axis is randomly selected from a range or set prescribed in the synthetic data generation parameters (703). In FIG. 7, a time domain with events (709) is shown. In the example of FIG. 7, the time domain with events (709) has two events. One of the events has a geometric shape of a linear line (711) and the other event has a geometric shape of a hyperbola (713). In accordance with one or more embodiments, the number of events (two), their geometric shapes, and their forms and locations were determined through random selection within options described by the user-provided synthetic data generation parameters (703). Further, an example trace (715) is represented with a dashed line. An alternative view (717) of the example trace (715) of the time domain with events (709) is shown in FIG. 7. As shown, and in accordance with one or more embodiments, the example trace (715) has a value of one at the time or depth where an event occurs. In other embodiments, the value of a trace at an intersection with an event may be a value other than one.

In FIG. 7, in Block 710, a wavelet and wavelet parameters are selected. Again, the available options for a wavelet and its parameters and the method for selecting a wavelet and its parameters are defined by the user-provided synthetic data generation parameters (703). In one or more embodiments, the wavelet is the Ormsby wavelet and its associated wavelet parameters include four corner frequencies. The Ormsby wavelet and associated corner frequencies will be described in greater detail later in the instant disclosure. For now, it is sufficient to say that the wavelet parameters, or ranges or sets for each parameter and a method of selecting the values for each wavelet parameter are defined in the synthetic data generation parameters (703). In one or more embodiments, a single wavelet is selected for the entire synthetic dataset. That is, the selected wavelet will be applied to every event in every trace (through convolution). In other embodiments, a wavelet is selected for each event.

As previously stated, the synthetic dataset generation process creates a synthetic dataset that is a pair of input-target seismic datasets. The input portion of the synthetic dataset is referred to as a narrow bandwidth seismic dataset and the target portion is referred to as a broad bandwidth seismic dataset where the bandwidth of the broad bandwidth seismic dataset is greater (i.e., extended to contain lower frequencies) relative to the narrow bandwidth seismic dataset. Thus, when generating a synthetic dataset, both the narrow bandwidth seismic dataset and the broad bandwidth seismic dataset need to be formed. Returning to FIG. 7, in Block 712, the time domain with events (709) is duplicated to form the narrow bandwidth seismic dataset and the broad bandwidth seismic dataset. In one or more embodiments, the time domain with events (709), upon duplication, is said to form a first time domain and a second time domain. In one or more embodiments, the first time domain is, or will be used for, the narrow bandwidth seismic dataset. The second time domain is, or will be used for, the broad bandwidth seismic dataset.

In general, the relative bandwidths of the narrow bandwidth seismic dataset and the broad bandwidth seismic dataset are controlled through selection of the wavelet parameters, where different wavelet parameters are used to generate the narrow bandwidth seismic dataset and the broad bandwidth seismic dataset. In one or more embodiments, the amplitude of a wavelet is further randomly selected from a range of amplitudes where the range is bounded by and amplitude lower bound, $A_l$, and an amplitude upper bound, $A_u$, according to a probability distribution over the range of amplitudes. In one or more embodiments, the amplitude of the wavelet may further be a function of time or depth. For example, the amplitude may be defined to decrease at a given rate according to time or depth. In general, the amplitude of a wavelet may be prescribed through an amplitude function, wherein the amplitude function is defined in the synthetic data generation parameters (703). In the simplest case, the amplitude function is a constant function (i.e., invariant to time or depth) and the amplitude is randomly selected from a range defined by the synthetic data generation parameters (703) (i.e., between an amplitude lower bound, $A_l$, and an amplitude upper bound, $A_u$).

As previously stated, to properly train the machine-learned model (304), for each synthetic seismic dataset, the broad bandwidth seismic dataset (i.e., target dataset) must have an extended frequency range (including low frequencies) relative to the narrow bandwidth seismic dataset (i.e., input dataset). Keeping with Block 712 of FIG. 7, this requirement is enforced by using different wavelet parameters for the narrow bandwidth seismic dataset and the broad bandwidth seismic dataset. The differing wavelet parameters are such that the broad bandwidth seismic dataset will include lower frequencies than its associated narrow bandwidth seismic dataset. In one or more embodiments, the wavelet parameters include a first parameter set and a second parameter set. The first parameter set includes the parameters necessary to describe the wavelet that is to be applied to the first time domain to generate the narrow bandwidth seismic dataset (through convolution described below). The second parameter set includes the necessary parameters to describe the wavelet that is be applied to the second time domain to generate the broad bandwidth seismic dataset.

As such, in Block 712, the appropriate wavelets are convolved with the traces of the first time domain and the second time domain to form the narrow bandwidth seismic dataset and the broad bandwidth seismic dataset, respectively. For example, in the case where a single wavelet type (which may be time or depth dependent) is to be applied to every event in a synthetic dataset, the wavelet with extended frequency content (described by the second parameter set) is convolved with each trace of the copy of the time domain with events known as the second time domain (i.e., forming the broad bandwidth seismic dataset) and the wavelet without extended frequency content (described by the first parameter set) is convolved with each trace of the copy of the time domain with events known as the first time domain (i.e., forming the narrow bandwidth seismic dataset). In one or more embodiments, wavelet parameters for the board and narrow bandwidth seismic datasets are additionally a function of time or depth, where the functional relationship between time or depth and frequency content is defined in the user-provided synthetic data generation parameters (703). Changing the frequency content as a function of time or depth mimics can aid in mimicking real seismic datasets where the temporal frequency bandwidth is not stationary or constant for all events. The variation in temporal frequency bandwidth may be due to absorption and the frequency content is reduced with two-way travel time. Therefore, the frequency bandwidth of later primary reflection arrivals is always less than that of earlier arrivals. In case of a marine seismic acquisition, multiple reverberations travelling in the water layer will show broader bandwidth than subsurface reflections with the same arrival time, since the former experience much less absorption than the latter.

To properly train the machine-learned model (304) to extend the frequency content of a given seismic dataset to include lower frequencies, the choice and application of a wavelet to both the narrow bandwidth seismic dataset (i.e., training input) and the broad bandwidth seismic dataset (i.e., training target) is critical. It is noted that an objective of the low-frequency bandwidth extension is suppression of the sidelobes and ringing of the wavelet. Not all wavelets are suitable to this task. As an example, consider the Ricker wavelet. A feature of Ricker wavelets is that Ricker wavelets have the same, and constant, sidelobe amplitude level. Mathematically, the amplitude of sidelobes of Ricker wavelet is given as $$A = -\frac{2}{e^{3/2}}. \quad \text{EQ 4}$$

Figures 8, 9A, 9B:
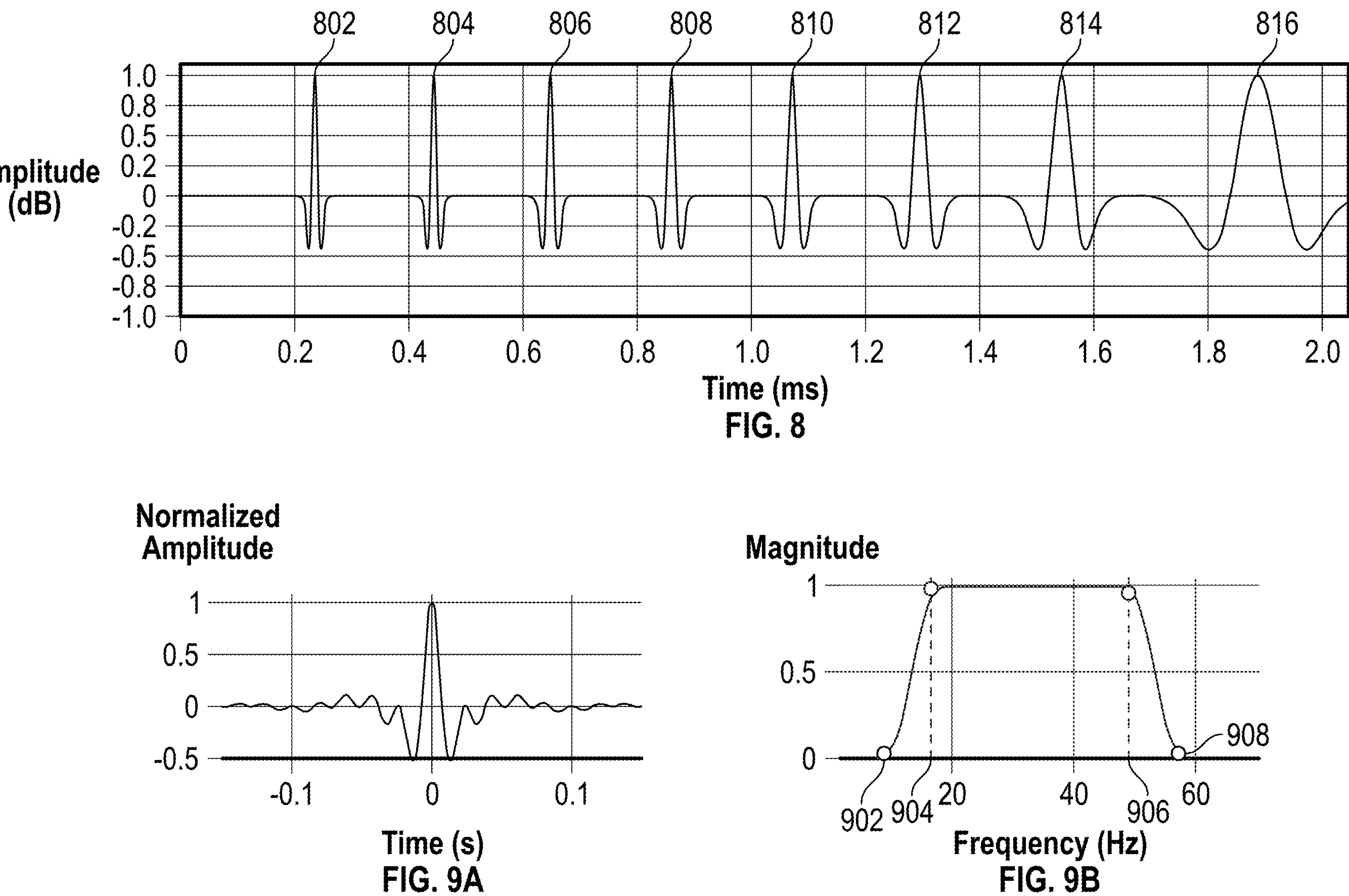
FIG. 8 depicts a Ricker wavelet at various frequencies in accordance with one or more embodiments.
FIG. 9A depicts an Ormsby wavelet in accordance with one or more embodiments.
FIG. 9B depicts the magnitude of the frequency spectrum of an Ormsby wavelet in accordance with one or more embodiments.

FIG. 8 depicts the constant amplitude behavior of Ricker wavelets over a variety of frequencies. Specifically, FIG. 8 depicts an 80 Hz Ricker wavelet (802), a 70 Hz Ricker wavelet (804), a 60 Hz Ricker wavelet (806), a 50 Hz Ricker wavelet (808), a 40 Hz Ricker wavelet (810), a 30 Hz Ricker wavelet (812), a 20 Hz Ricker wavelet (814), and a 10 Hz Ricker wavelet (816). Note that the Ricker wavelets of FIG. 8 have arbitrary time shifts such that they do not overlap to promote legibility. As seen in FIG. 8, the Ricker wavelet, regardless of its frequency, has the same sidelobe amplitude, as provided by EQ. 4.

In accordance with one or more embodiments, the wavelet used in the synthetic data generation process, depicted in FIG. 7, is the Ormbsy wavelet. An example Ormsby wavelet is depicted in FIG. 9A. The Ormbsy wavelet is defined by four corner frequencies. FIG. 9B depicts the magnitude of the frequency spectrum of the Ormsby wavelet depicted in FIG. 9A. The four corner frequencies that define the Ormsby wavelet can be visualized using FIG. 9B. As seen in FIG. 9B, the four corner frequencies are referenced herein as the first corner frequency (902), $f_1$, the second corner frequency (904), $f_2$, the third corner frequency (906), $f_3$, and the fourth corner frequency (908), $f_4$. Generally, the magnitude of the frequency spectrum of an Ormsby wavelet takes the shape of a trapezoid with four corners. The four corner frequencies simply represent the frequency location of the four corners of the trapezoid when viewing the magnitude of the frequency spectrum of the Ormsby wavelet. Under this notation, mathematically, it is required that $f_1<f_2<f_3<f_4$. Thus, the amplitude of the Ormbsy wavelet in the time domain is given as $$A(t) = \frac{\pi f_1^2}{f_2 - f_1}\mathrm{sinc}^2(\pi f_1 t) - \frac{\pi f_2^2}{f_2 - f_1}\mathrm{sinc}^2(\pi f_2 t) - \frac{\pi f_3^2}{f_4 - f_3}\mathrm{sinc}^2(\pi f_3 t) + \frac{\pi f_4^2}{f_4 - f_3}\mathrm{sinc}^2(\pi f_4 t). \quad \text{EQ 5}$$

In the embodiments that employ the Ormsby wavelet, the synthetic data generation parameters (703) include ranges or set and method(s) of selection for the first corner frequency (902), second corner frequency (904), third corner frequency (906), and fourth corner frequency (908) as wavelet parameters. The corner frequencies for the narrow bandwidth seismic dataset can be written as $$f_1^{narrow},$$

$$f_2^{narrow},$$

$$f_3^{narrow},$$

and $$f_4^{narrow}$$

and may be included the first parameter set of the wavelet parameters. Similarly, the corner frequencies for the broad bandwidth seismic dataset can be written as $$f_1^{broad},$$

$$f_2^{broad},$$

$$f_3^{broad},$$

and $$f_4^{broad}$$

and may be included in the second parameter set of the wavelet parameters. In accordance with one or more embodiments, $$f_3^{narrow},$$

$$f_4^{narrow},$$

$$f_3^{broad},$$

and $$f_4^{broad}$$

are randomly selected, according to a uniform distribution from a range or set defined in the synthetic data generation parameters (703), however, $$f_3^{narrow} = f_3^{broad}$$

and $$f_4^{narrow} = f_4^{broad}.$$

For example, the synthetic data generation parameters (703) may define a third corner frequency range as $$\left[f_3^{lower}, f_3^{upper}\right]$$

where the superscripts "lower" and "upper" refer to the lower and upper limits of the range, respectively. Likewise, the synthetic data generation parameters (703) may define a fourth corner frequency range as $$\left[f_4^{lower}, f_4^{upper}\right].$$

In instances where the third and fourth corner frequency ranges overlap $$\left(\text{i.e., } f_4^{lower} < f_3^{upper}\right)$$

selection of these corner frequencies is performed such that $f_3<f_4$. Thus, in these embodiments, for a given synthetic dataset a third frequency $f_3$ may be drawn from the prescribed third frequency range and $$f_3^{narrow}$$

and $$f_3^{broad}$$

are set to the third frequency. Likewise, for the same given synthetic dataset a fourth frequency $f_4$ may be drawn from the prescribed fourth frequency range and $$f_4^{narrow}$$

and $$f_4^{broad}$$

are set to the fourth frequency.

Further, in these embodiments, a first frequency range and a second frequency range may be defined in the synthetic data generation parameters (703). For example, the first corner frequency range may be given as $$\left[f_1^{lower}, f_1^{upper}\right]$$

and the second corner frequency range may be given as $$\left[f_2^{lower}, f_2^{upper}\right].$$

Again, in instances where the first and second corner frequency ranges overlap $$\left(\text{i.e., } f_2^{lower} < f_1^{upper}\right),$$

selection of these corner frequencies is performed such that $f_1<f_2$. In one or more embodiments using the Omrsby wavelet, for a given synthetic dataset the selection of the first and second corner frequencies for the narrow bandwidth seismic dataset and the broad bandwidth seismic dataset proceeds as follows. First, a first frequency and a second frequency are randomly selected, according to a uniform distribution, from the first and second corner frequency ranges, respectively. The selected first and second corner frequencies are listed as $$f_1^{selected}$$

and $$f_2^{selected},$$

respectively, where is $$f_1^{selected} < f_2^{selected}$$

is enforced. The first and second corner frequencies for the narrow bandwidth seismic dataset $$(\text{i.e., } f_1^{narrow} \text{ and } f_2^{narrow})$$

are set to $$f_1^{selected}$$

and $$f_2^{selected}.$$

Then, the first and second corner frequencies for the broad bandwidth seismic dataset are selected from adapted first and second corner frequency ranges. The adapted first and second corner frequency ranges take the form $$\left[f_1^{lower}, f_1^{selected}\right]$$

and $$\left[f_2^{lower}, f_2^{selected}\right],$$

respectively. Selecting first and second corner frequencies for the broad bandwidth seismic dataset from the adapted ranges ensures that $$f_1^{broad} < f_1^{narrow}$$

and $$f_2^{broad} < f_2^{narrow}.$$

Thus, when training the machine-learned model (304), the broad bandwidth seismic dataset will have extended frequencies (inclusive of lower frequencies) relative to its associated narrow bandwidth seismic dataset.

In other embodiments involving the Ormsby wavelet, the synthetic data generation parameters (704) define separate frequency ranges for the first and second corner frequencies for both the narrow bandwidth seismic dataset and the broad bandwidth seismic dataset using the first parameter set and the second parameter set, respectively. That is, in these embodiments, the synthetic data generation parameters include the following ranges:

$$[f_1^{lower}, f_1^{upper}]_{narrow},$$

$$[f_1^{lower}, f_1^{upper}]_{broad},$$

$$[f_2^{lower}, f_2^{upper}]_{narrow},$$

$$[f_2^{lower}, f_2^{upper}]_{broad},$$

$$[f_3^{lower}, f_3^{upper}],$$

and $$[f_4^{lower}, f_4^{upper}],$$

where the subscripts "narrow" and "broad" refer to the narrow bandwidth seismic dataset and the broad bandwidth seismic dataset, respectively. Because the third and fourth corner frequencies are the same for the narrow bandwidth seismic dataset and the broad bandwidth seismic dataset, subscripts are not needed. Regardless of the method used to determine the corner frequencies, it is always enforced that $$f_1^{narrow} < f_2^{narrow} < f_3 < f_4,$$

$$f_1^{broad} < f_2^{broad} < f_3 < f_4, f_1^{broad} < f_1^{narrow},$$

and $$f_2^{broad} < f_2^{narrow}.$$

It is emphasized the corner frequencies are independently selected for each synthetic dataset according to the wavelet parameters in the synthetic data generation parameters (703). Thus, the frequency content of a synthetic dataset may be unique for each synthetic dataset in the training data.

Figure 10:
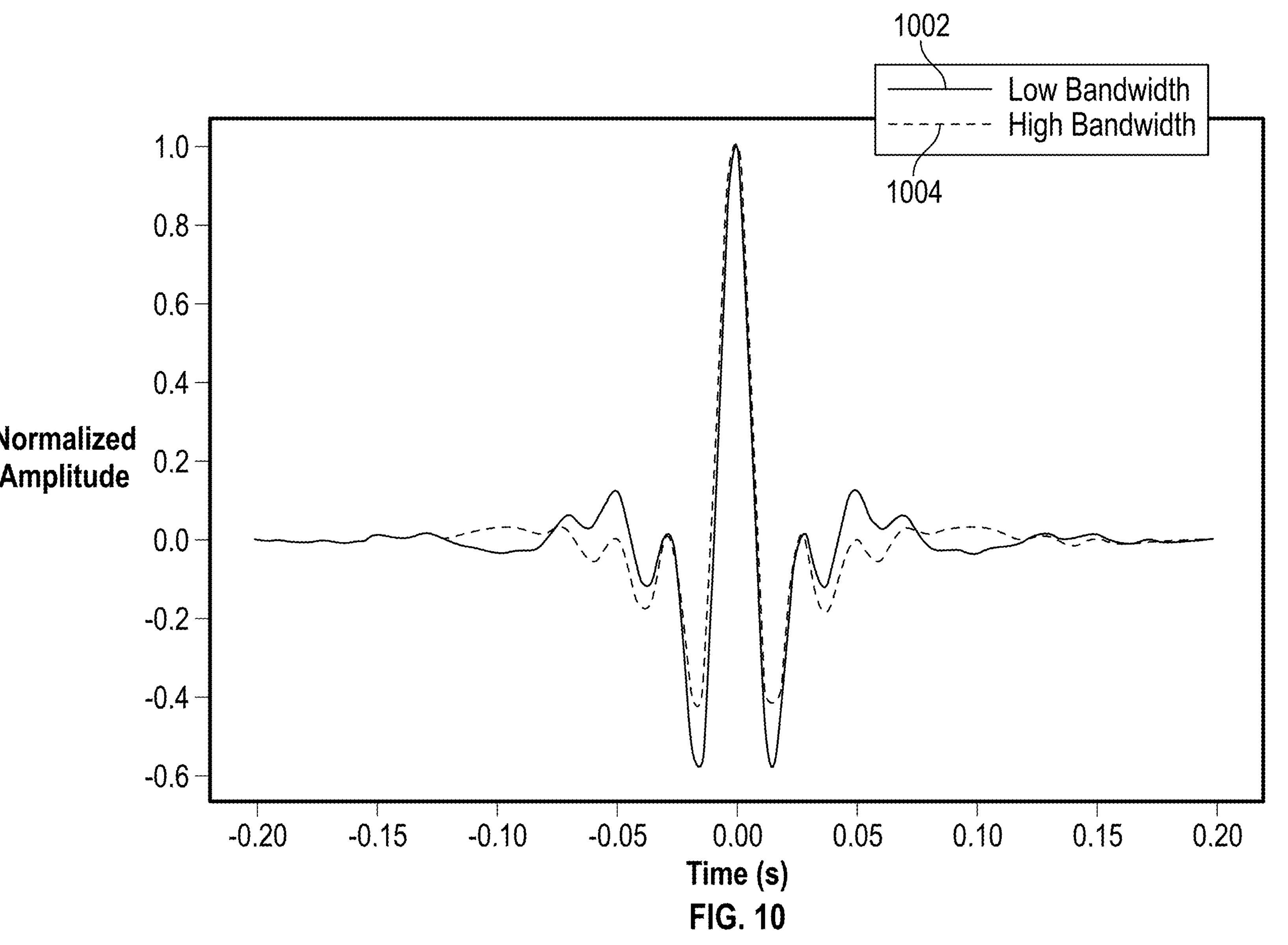
FIG. 10 depicts an example narrow bandwidth Ormsby wavelet and an example broad bandwidth Ormsby wavelet in accordance with one or more embodiments.

FIG. 10 depicts an example narrow bandwidth Ormsby wavelet (1002) and an example broad bandwidth Ormsby wavelet (1004). The corner frequencies for the example narrow bandwidth Ormsby wavelet (1002) of FIG. 10 are $$f_1^{narrow} = 10,$$

$$f_2^{narrow} = 15,$$

$$f_3^{narrow} = 40,$$

$$f_4^{narrow} = 50.$$

The corner frequencies for the example broad bandwidth Ormsby wavelet (1004) of FIG. 10 are $$f_1^{broad} = 5,$$

$$f_2^{broad} = 10,$$

$$f_3^{broad} = 40,$$

$$f_4^{broad} = 50.$$

The example narrow bandwidth Ormsby wavelet (1002) and the example broad bandwidth Ormsby wavelet (1004) have the same values for the third and fourth corner frequencies. However, the first and second corner frequencies are lower for the example broad bandwidth Ormsby wavelet (1004) relative to the example narrow bandwidth Ormsby wavelet (1002). Thus, the example wavelets of FIG. 10 demonstrate a suitable pair of wavelets that may be used in convolution with the narrow bandwidth seismic dataset and the broad bandwidth seismic dataset of a synthetic dataset. That is, in forming a synthetic dataset, once a time domain with events (e.g., See 709 of FIG. 7) has been constructed and duplicated, the example narrow bandwidth Ormsby wavelet (1002) could be convolved with the traces of first time domain to form the narrow bandwidth seismic dataset and the example broad bandwidth Ormsby wavelet (1004) could be convolved with the traces of the second time domain to form the broad bandwidth seismic dataset.

To aid in understanding the convolution of the wavelets to the narrow bandwidth seismic dataset and the narrow bandwidth seismic dataset of Block 712, FIG. 7 depicts plots of the example narrow bandwidth Ormsby wavelet (1002) and example broad bandwidth Ormsby wavelet (1004) of FIG. 10 convolved with the example trace (715) of the time domain with events (709). The convolution of the example narrow bandwidth Ormsby wavelet with the example trace (715) is given in the first example convolution plot (719). The convolution of the example broad bandwidth Ormsby wavelet with the example trace (715) is given in the second example convolution plot (721). Again, it is emphasized that in one or more embodiments the wavelet parameters (e.g., corner frequencies) of the wavelets may additionally be a function of time or depth, where the functional relationship between time or depth and wavelet parameters is defined in the user-provided synthetic data generation parameters (703). Changing the wavelet parameters of the wavelet as a function of time or depth can mimic real seismic datasets where the temporal frequency bandwidth is not stationary or constant for all events. The variation in temporal frequency bandwidth is due to absorption and the frequency content is reduced with two-way travel time. Therefore, the frequency bandwidth of later primary reflection arrivals is always less than that of earlier arrivals. In case of a marine seismic acquisition, multiple reverberations travelling in the water layer will show broader bandwidth than subsurface reflections with the same arrival time, since the former experience much less absorption than the latter.

In Block 714, noise parameters are determined from the synthetic data generation parameters (703). Various types of noise may be added to the synthetic dataset. For example, random perturbations can be applied to each of the traces in the narrow and broad bandwidth seismic datasets. The strength of the perturbations can be described by a variance. In one or more embodiments, the variance of noise applied to the synthetic dataset is randomly sampled from within a range bounded by a variance lower bound, $$\sigma_l^2,$$

and a variance upper bound, $$\sigma_u^2.$$

In one or more embodiments, the range of available variances is given in the synthetic data generation parameters (703). In one or more embodiments, static noise may also be applied to the synthetic dataset. Static noise is applied by shifting in time or depth, by a prescribed amount (e.g., random), the traces in the seismic dataset. Further, in one or more embodiments, the amplitudes of various traces may be altered (e.g., multiplied by a random factor). Such an alteration injects noise into the synthetic dataset and is intended to mimic variation in seismic receiver (120) sensitivities or couplings. In Block 716, once the noise parameters have been determined, the noise is applied to the synthetic dataset. One with ordinary skill in the art will appreciate that noise can be added to the synthetic dataset in variety of ways and that not all noise injection schemes can be enumerated herein. Further, any noise injection scheme can be applied to the synthetic dataset without departing from the scope of this disclosure.

To summarize the synthetic data generation process of the instant disclosure, it is emphasized that there is no geological model from which synthetic seismic datasets are generated. Rather, a large number of geometric shapes are injected directly into a representative time domain (or spatial domain). In one or more embodiments, each synthetic seismic dataset contains between 50 and 250 events, and each event can have a linear or a hyperbolic moveout. Further, in one or more embodiments, amplitude, amplitude variation with offset, statics and Gaussian noise are also randomly determined and applied to the synthetic seismic datasets. In one or more embodiments, all events are zero phase.

The result of the synthetic data generation process of FIG. 7 is a synthetic dataset. The synthetic dataset is composed of both a narrow bandwidth seismic dataset and a broad bandwidth seismic dataset. Again, examples of a synthetic datasets are shown in FIGS. 6A and 6B. As seen, for a given synthetic dataset, the narrow bandwidth seismic dataset and the broad bandwidth seismic dataset are similar because the time domain was duplicated after the selection and incorporation of events into the time domain. The difference between the narrow bandwidth seismic dataset and the broad bandwidth seismic dataset lies in differences in the wavelets. For example, when using an Ormsby wavelet, the Ormsby wavelet convolved with the traces of the broad bandwidth seismic dataset is has lower first and second corner frequencies than the Ormsby wavelet convolved with the traces of the narrow bandwidth seismic dataset.

Figure 11:
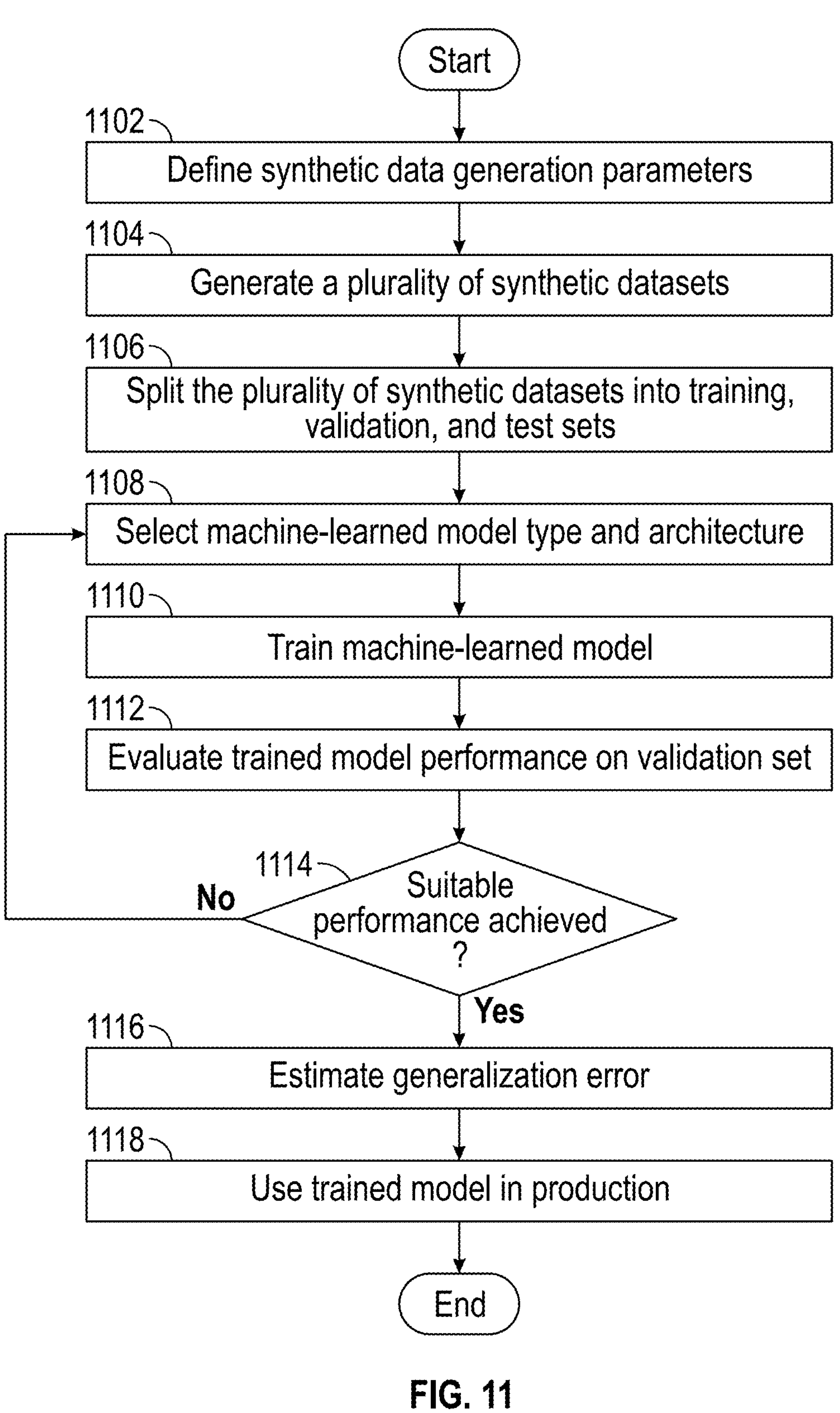
FIG. 11 depicts a flowchart in accordance with one or more embodiments.

By repeating the synthetic data generation process outlined in the flowchart of FIG. 7, a plurality of synthetic datasets, wherein each synthetic dataset comprises a narrow bandwidth seismic dataset and an associated broad bandwidth seismic dataset, can be formed. The plurality of seismic datasets can be used as training data to train the machine-learned model (304). The process of generating the plurality of synthetic datasets and using the plurality of synthetic datasets to, in part, train the machine-learned model (304) is depicted in FIG. 11, in accordance with one or more embodiments. In Block 1102, a user defines the synthetic data generation parameters (703) that will guide the synthetic data generation process. The user defines all parameters and associated functions and/or probability distributions desired for use during the synthetic data generation process. For example, the user may specify that for each synthetic dataset a random number of events should be used and that the randomly drawn number must come from a specified range. In Block 1104, the synthetic data generation process of FIG. 7 is applied multiple times to generate a plurality of synthetic datasets. In Block 1106, the plurality of synthetic datasets is split into a training set, validation set, and test set. In one or more embodiments, the validation and the test set are the same such that the plurality of synthetic datasets is effectively split into a training set and a validation/testing set. In accordance with one or more embodiments, multiple machine-learned model types and architectures are evaluated to discover the model with the best performance. In Block 1108, a machine-learned model type (e.g., a CNN) and an architecture (e.g., number of layers, kernel sizes, activation functions) are selected. In accordance with one or more embodiments, the selection of the machine-learned model type and architecture is performed by cycling through a set of user-defined models and associated architectures. In other embodiments, the machine-learned model type and architecture are selected based on the performance of previous models, for example, using a Bayesian-based search. In Block 1110, with a machine-learned model type and associated architecture selected, the machine-learned model is trained using the training set. The training set is composed of a portion of the plurality of synthetic datasets. Each synthetic dataset consists of a narrow bandwidth seismic dataset and an accompanying broad bandwidth seismic dataset. During training, one or more narrow bandwidth seismic datasets are provided to the machine-learned model as an input. The machine-learned model processes the one or more narrow bandwidth seismic datasets and produces an output. The output is compared to the associated broad bandwidth seismic datasets. During training, the machine-learned model is adjusted such that the output of the machine-learned model, upon receiving one or more narrow bandwidth seismic datasets, is similar to the associated broad bandwidth seismic datasets. Once the machine-learned model is trained, in Block 1112, the narrow bandwidth seismic datasets of the validation set are processed by the trained machine-learned model and its output is compared to the broad bandwidth seismic datasets of the validation set. Thus, the performance of the trained machine-learned model can be evaluated. Block 1114 represents a decision. If the trained machine-learned model is found to have suitable performance as evaluated on the validation set, where the criterion for suitable performance is defined by a user, then the trained machine-learned model is accepted for use on new seismic datasets. When the machine-learned model is used on non-synthetic seismic datasets where the use of the machine-learned model extends the bandwidth of a seismic dataset to include lower frequencies, the machine-learned model is said to be used in production. In Block 1118, the trained machine-learned model is used in production. However, before the machine-learned model is used in production a final indication of its performance can be acquired by estimating the generalization error of the trained machine-learned model, as shown in Block 1116. The generalization error is estimated by evaluating the performance of the trained machine-learned model, after a suitable model has been found, on the test set. One with ordinary skill in the art will recognize that the training procedure depicted in FIG. 11 is general and that many adaptions can be made without departing from the scope of the present disclosure. For example, common training techniques, such as early stopping, adaptive or scheduled learning rates, and cross-validation may be used during training without departing from the scope of this disclosure.

Figure 12:
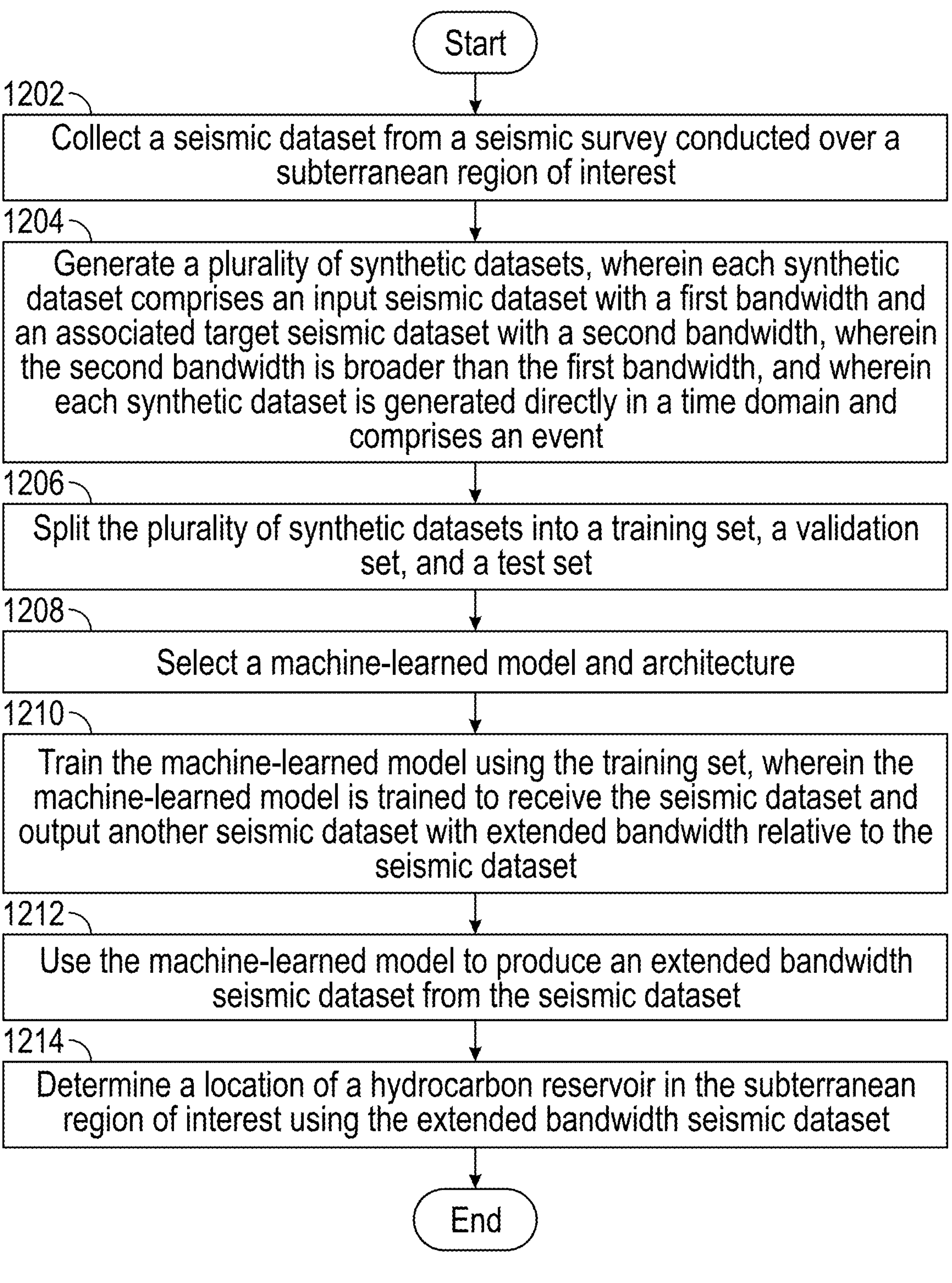
FIG. 12 depicts a flowchart in accordance with one or more embodiments.

FIG. 12 depicts a flowchart outlining the process of training and using a machine-learned model to extend the bandwidth of one or more seismic datasets. In Block 1202, a seismic dataset is collected from a seismic survey conducted over a subterranean region of interest (102). The seismic dataset may resemble that shown in FIG. 2. That is, the seismic dataset is a collection of traces, where each trace records the amplitude of ground-motion at a sequence of discrete sample times. It is noted that once acquired, a seismic dataset may undergo a myriad of pre-processing steps. One with ordinary skill in the art will recognize that zero or more pre-processing (or processing) steps may be applied with the methods disclosed herein without imposing a limitation on the instant disclosure. In one or more embodiments, the seismic dataset is evaluated by a subject matter expert to inform and set the synthetic data generation parameters (703). In this way, the synthetic data generation parameters (703) may be configured to produce, and/or encompass, synthetic datasets with similar structure as the collected seismic dataset. In Block 1204, a plurality of synthetic datasets is generated. Each synthetic dataset includes a narrow bandwidth seismic dataset and an accompanying broad bandwidth seismic dataset. To be precise, the narrow bandwidth seismic dataset is referred to as the input seismic dataset where the input seismic dataset has a first bandwidth. Likewise, the broad bandwidth seismic dataset is referred to as the target seismic dataset and the target seismic dataset has a second bandwidth. The second bandwidth is broader than the first bandwidth as the second bandwidth spans the entirety of the first bandwidth and further includes lower frequencies than those present in the first bandwidth. Thus, each synthetic dataset has an input-target pair that may be used for training the machine-learned model. Further, each synthetic seismic dataset is generated directly in the time domain (or a spatial domain) and does not make use of a forward modeling process. Each seismic dataset has one or more events in the time domain. Each event of a seismic dataset has an associated geometric shape (e.g., a linear line, hyperbolic line, etc.). Further, each event is convolved with a wavelet. The frequency content of the wavelet(s) used in the target seismic datasets is extended such that the wavelet(s) include lower frequencies than present in the associated input seismic datasets. In one or more embodiment the synthetic data generation parameters (703) include wavelet parameters that further include a first parameter set and a second parameter set. The first parameter set is composed of parameters that define, or may be used to define, the wavelet(s) convolved with the first time domain forming the narrow bandwidth seismic dataset. The second parameter set is composed of the parameters that define, or may be used to define, the wavelet(s) convolved with the second time domain forming the broad bandwidth seismic dataset. Thus, the wavelet parameters are structured such that the broad bandwidth seismic dataset is similar with respect to the events in the time domain, but has a broader frequency spectrum, to include low frequencies, than its associated narrow bandwidth seismic dataset. Because each event is convolved with a wavelet, it may be said that each event can be defined (or includes) both a geometric shape and a wavelet.

In Block 1206, the plurality of synthetic seismic datasets is split into a training set, validation set, and a test set. In one or more embodiments, the validation set and the test set are the same. In Block 1208, a machine-learned model type and associated architecture are selected. In Block 1210, the machine-learned model is trained using, at least, the training set. The machine-learned model is configured to receive the seismic dataset and output another seismic dataset with extended bandwidth relative to the received seismic dataset. It is noted that Blocks 1208 and 1210 may be implemented iteratively such that many different machine-learned model types and architectures may be explored, trained, and evaluated until a suitable or best model is found. In Block 1212, the trained machine-learned model is used to process the seismic dataset and produce an extended bandwidth seismic dataset. In one or more embodiments, the trained machine learned model can be made available for use with other seismic datasets, or newly acquired seismic datasets. Thus, in situations where a machine-learned model has been previously trained, according to the processes described herein, with robust synthetic data (as described herein) Block 1202 may proceed directly to Block 1212. That is, once a machine-learned model with robust behavior has been developed, newly acquired seismic datasets may be processed directly by the machine-learned model with without the need to generate additional synthetic data and/or re-train a new machine-learned model (Blocks 1204, 1208, 1210). In Block 1214, the extended bandwidth seismic dataset is used, at least in part, to determine one or more geological features of the subterranean region of interest (102) and to determine the location of a hydrocarbon reservoir (104) in the subterranean region of interest (102). Further, the extended bandwidth seismic dataset may be used to construct subsurface models of the subterranean region of interest (102). For example, the extended bandwidth seismic dataset may be used to characterize and locate hydrocarbon reservoirs (104) and may be used to plan and drill a wellbore to extract said hydrocarbons. Additional information regarding drilling a wellbore will be provided later in the instant disclosure. Further, the extended bandwidth seismic dataset and the subsurface models can inform oil and gas field planning and lifecycle management decisions. It is emphasized that the quality of subsurface models, efforts to locate hydrocarbons, and well management decisions are all improved when using the extended bandwidth seismic dataset produced by the trained machine-learned model as opposed to the original seismic dataset.

As a concrete example of the methods, processes, models, and techniques described herein, a plurality of synthetic datasets was generated, a machine-learned model was trained, and the results of the machine-learned model were evaluated on both artificial and real seismic datasets. These results will be shown in FIGS. 13-15 with an accompanying discussion herein. For the following examples, 35,000 synthetic datasets were generated using the processes described in FIG. 7. The synthetic datasets each consist of a narrow bandwidth seismic dataset and an associated broad bandwidth seismic dataset. For the following examples, the time domain of the synthetic datasets consists of 256 traces each with 256 discrete time samples. The spacing, in time, between the time samples was set to 4 ms. It is emphasized that no forward modeling process was used to generate the synthetic datasets. Rather, each synthetic dataset was generated using a large number of geometric shapes. That is, each synthetic dataset was created using a varying number of events, which can have any shape, for example, but not limited to, linear and hyperbolic shapes. Further, the synthetic events were modeled with an Ormsby wavelet. For the present example, the wavelets of the synthetic datasets were given a random amplitude and random perturbations such as statics, amplitude variations, and random noise were applied to the synthetic datasets. A machine-learned model after the architecture shown in FIG. 5 was selected and trained, where 5000 of the 35,000 synthetic datasets were set aside as a validation/testing set. Thus, the machine-learned model was trained using 30,000 synthetic datasets. FIGS. 13-15 depict applications and results of the trained machine-learned model.

Figures 13A, 13B:
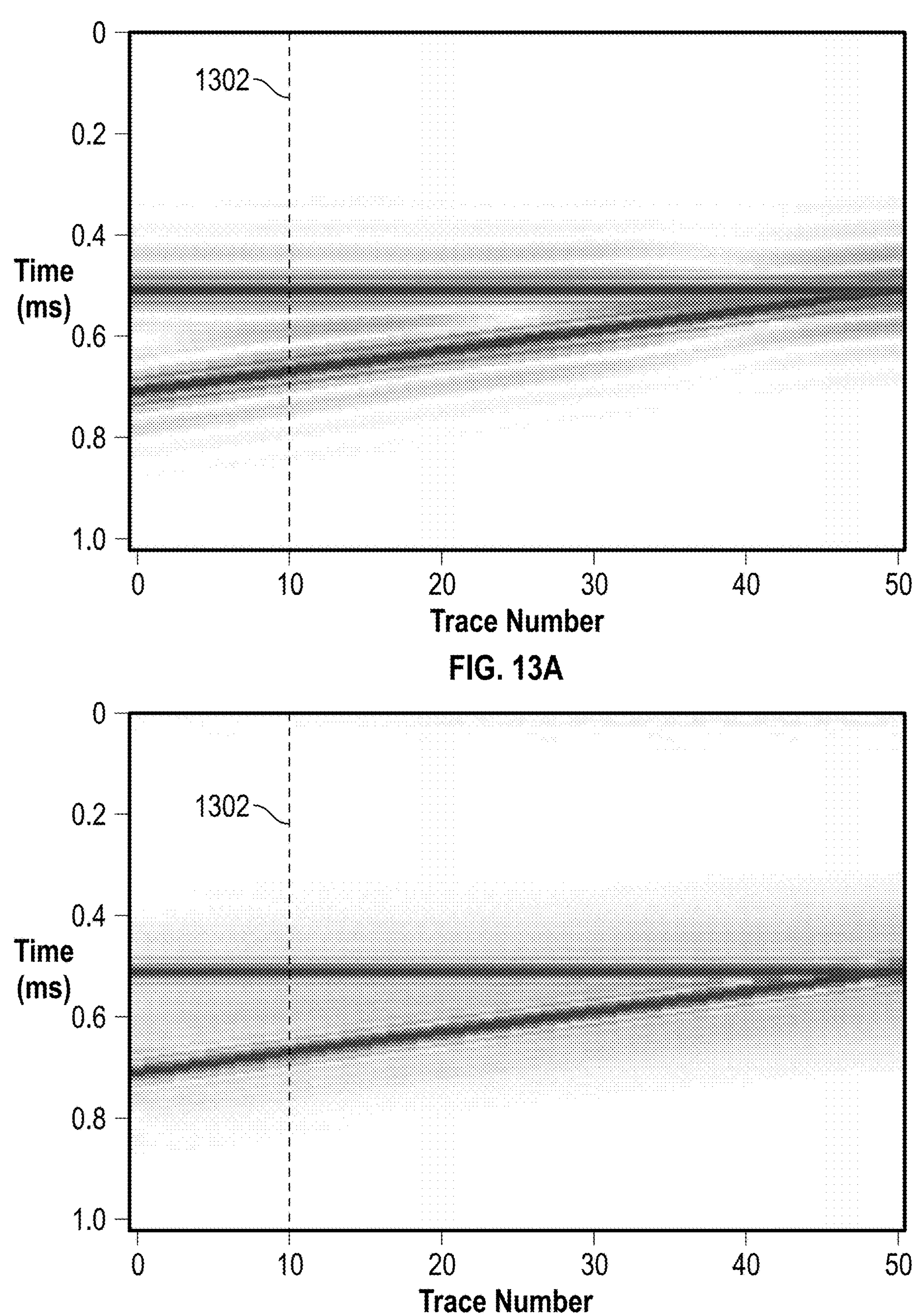
FIG. 13A depicts an artificial seismic dataset of a subsurface wedge in accordance with one or more embodiments.
FIG. 13B depicts an extended bandwidth seismic dataset upon processing, with a machine-learned model, an artificial seismic dataset of a subsurface wedge in accordance with one or more embodiments.
Figure 13C:
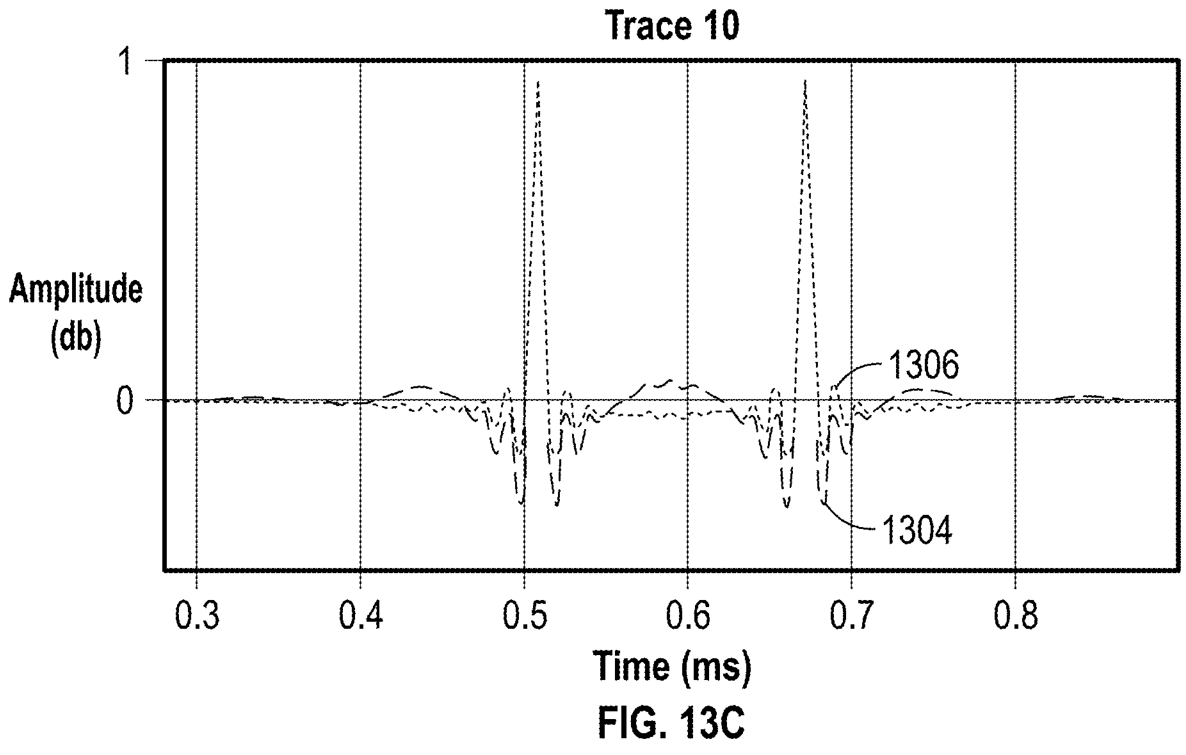
FIG. 13C depicts an arbitrary trace in accordance with one or more embodiments.
Figure 13D:
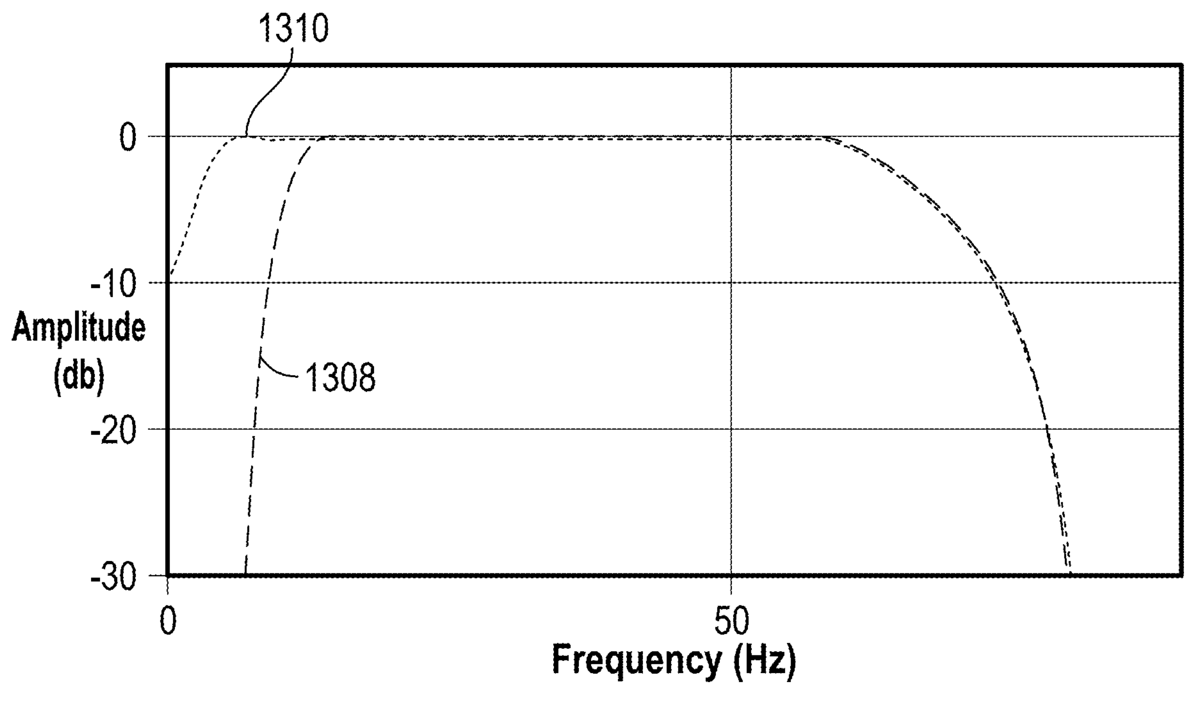
FIG. 13D depicts a frequency spectrum in accordance with one or more embodiments.

FIG. 13A depicts an example of a wedge model (i.e., a synthetic seismic dataset used to test and characterize the effects of the trained machine-learned model) with identical reflection coefficients at the top and base of the wedge. The wedge model of FIG. 13A was made using an Ormsby wavelet with the following corner frequencies: $f_1=3$, $f_1=7$, $f_1=75$, and $f_1=80$. Further, the wedge model of FIG. 13A is made of 50 traces and the wedge is 25 ms thick on the left-hand side of the model, reducing in thickness by 0.5 ms per trace towards the right-hand side. The wedge model (seismic dataset) was processed by the previously described trained machine-learned model. The output of the machine-learned model is depicted in FIG. 13B. For both the wedge model (i.e., input) and the output of the trained machine-learned model upon processing the wedge model, the trace indexed as number 10 (depicted with dashed line 1302) is plotted in FIG. 13C. Herein, the plotted traces of FIG. 13C are referenced as the first trace (1304) and a second trace (1306). The first trace (1304) corresponds to the index 10 trace (1302) of the wedge model (FIG. 13A) and the second trace (1304) corresponds to the index 10 trace (1302) of the machine-learned model output (FIG. 13B). As seen in FIG. 13C, the sidelobes present in the second trace (1306) have reduced amplitude compared to those in the first trace (1304). This results in reduced interference between the wavelets of the top and bottom reflectors. FIG. 13D depicts the frequency spectrum of the wedge model (1308) and the frequency spectrum of the machine-learned model output (1310). FIG. 13D verifies that the frequency content of the wedge model (FIG. 13A) has been extended to include lower frequencies.

Figure 14A:
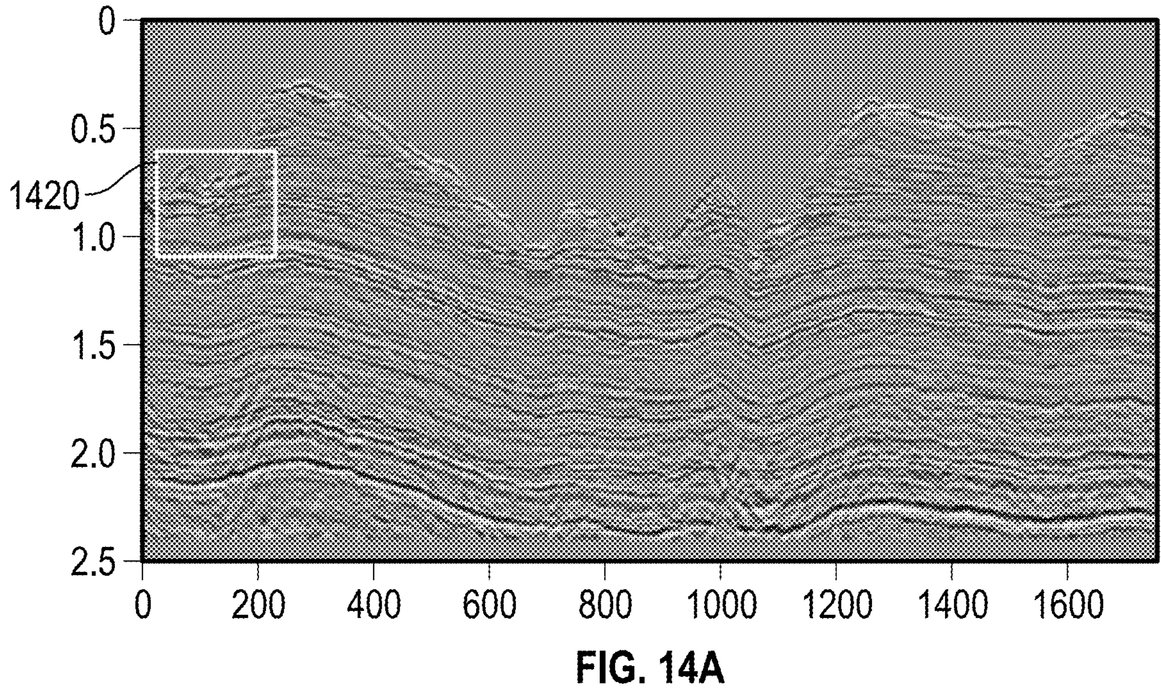
FIG. 14A depicts a real example seismic dataset in accordance with one or more embodiments.
Figure 14B:
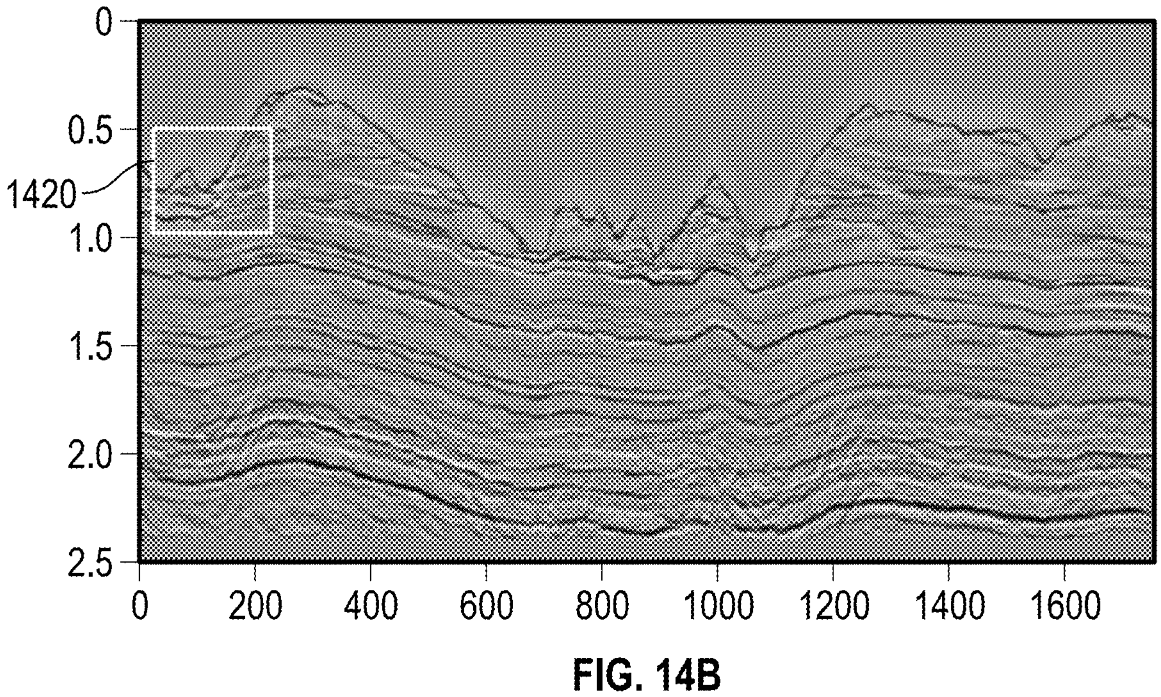
FIG. 14B depicts an extended bandwidth seismic dataset in accordance with one or more embodiments.
Figure 14C:
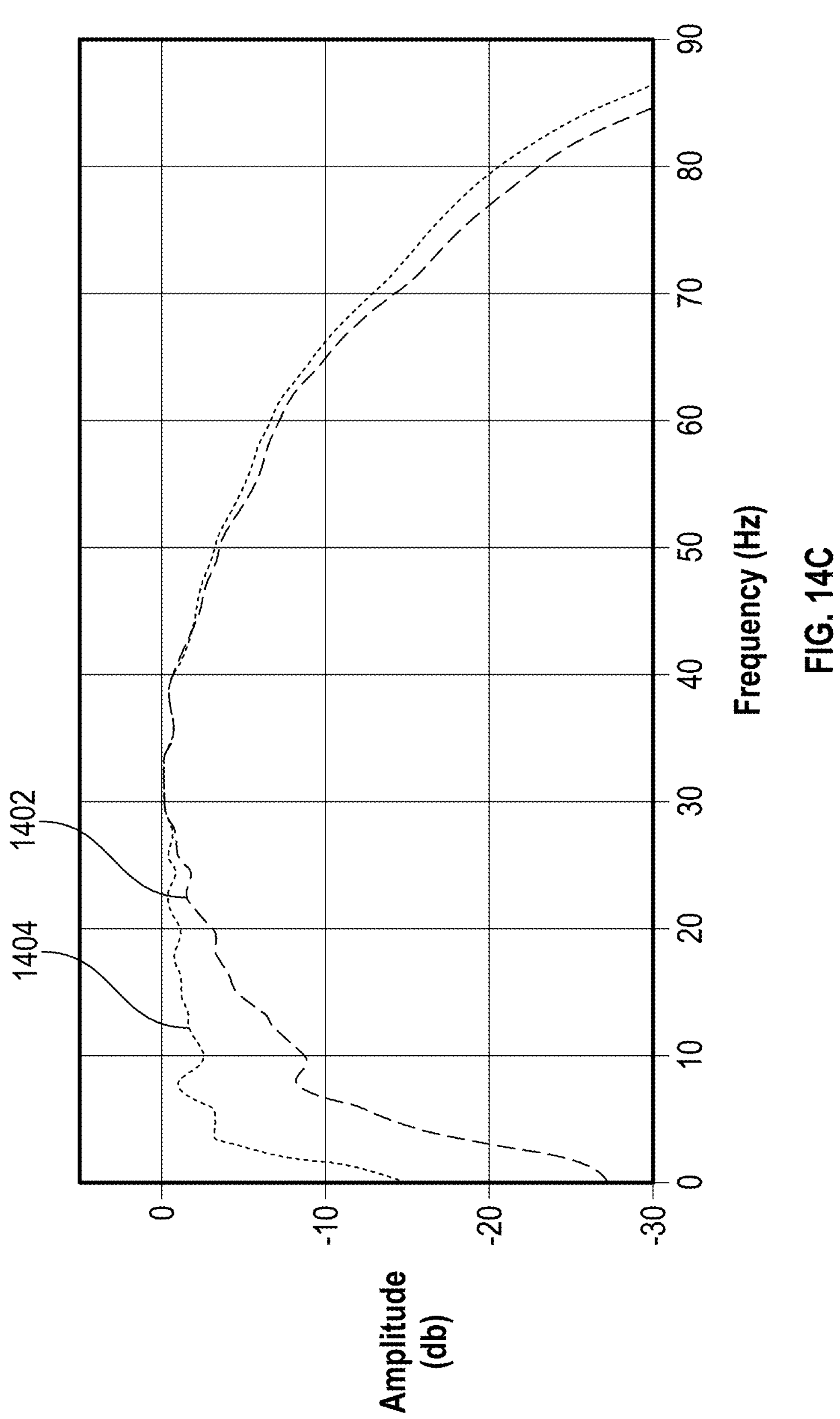
FIG. 14C depicts the frequency spectrum for the example seismic dataset of FIG. 14A and the frequency spectrum of the extended bandwidth seismic dataset of FIG. 14B.

FIG. 14A depicts a real seismic dataset acquired through a marine seismic survey. The real seismic dataset was processed with the previously described trained machine-learned model and the resulting output is depicted in FIG. 14B. FIG. 14C depicts the frequency spectrum for the original real seismic dataset (1402) of FIG. 14A and the frequency spectrum of the output seismic dataset (1404) of FIG. 14B. As demonstrated by these figures, the frequency content of the real seismic dataset is extended to include and/or amplify lower frequencies when processed by the trained machine-learned model. In particular, broader bandwidth images with more lower frequencies are easier to interpret in areas of complex structures, such as the area indicated with the rectangle (1420).

A further advantage of the methods and systems described herein, is that a given seismic dataset can be processed by the machine-learned model to produce a bandwidth extended seismic dataset and then the extended seismic dataset can be used with conventional full waveform inversion (FWI) techniques. The FWI techniques are enhanced by using the extended seismic dataset as opposed to the original seismic dataset. This is because the performance of FWI suffers severely when low frequencies are missing from the seismic dataset. In FWI a velocity model is defined and updated iteratively by minimizing the difference between recorded data and data modeled from a synthetic velocity model. When the modeled and observed data are shifted by more than half the dominant period, FWI suffers from the so-called "cycle skipping" problem that causes the inversion to be trapped in a local minimum. This cycle skipping failure of FWI can be attributed to a lack of low frequencies in recorded seismic data, since modeling with lower frequencies makes it easier to align modeled and real data. Thus, by first extending the bandwidth of the seismic dataset to include lower frequencies using the methods and systems disclosed herein, the cycle skipping problem and be avoided enhancing the FWI process and result.

Figures 15A, 15B, 15C, 15D:
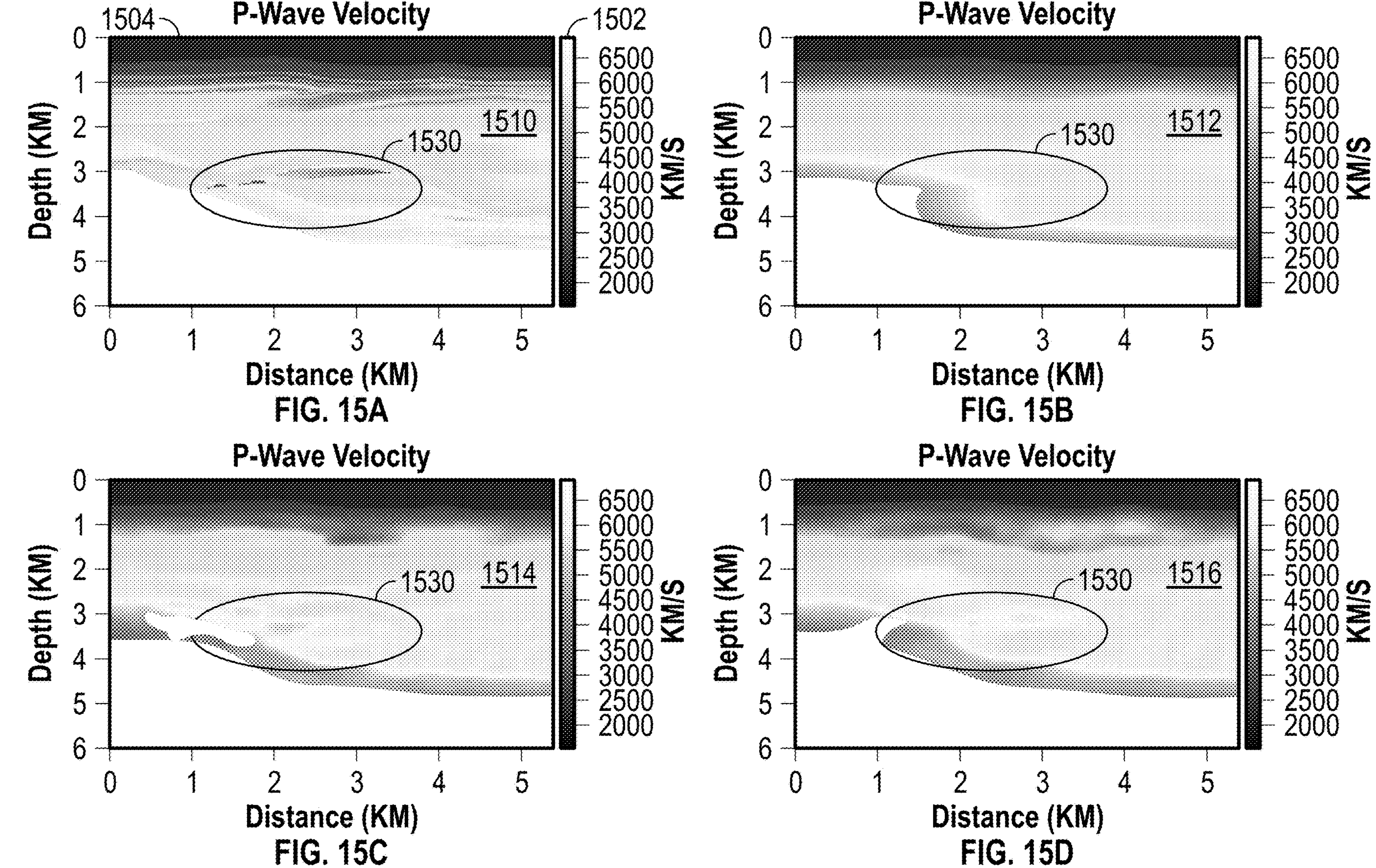
FIGS. 15A-D depicts an extended bandwidth seismic dataset in accordance with one or more embodiments.

FIGS. 15A-15D depict velocity models in accordance with one or more embodiments. In each of FIGS. 15A-15D the horizontal axis (1502) indicates horizontal distance, the vertical axis (1504) indicates depth below the surface and the seismic velocity is depicted using the grayscale (1506). FIG. 15A depicts a synthetic (numerical) velocity model. For the purposes of this example, FIG. 15A will be regarded as the true velocity model (1510) and will serve as a proxy for the actual velocities within a subsurface when the invention is applied in practice. FIG. 15B depicts a starting velocity model (1512) which is an approximation to the true velocity model (1510). In this example, the starting velocity model (1512) may be obtained by applying a smoothing filter to the true velocity model (1510), but in practical, real-world, application there are many ways of obtaining a suitable starting model well known to a person of ordinary skill in the art.

Figures 15E, 15F:
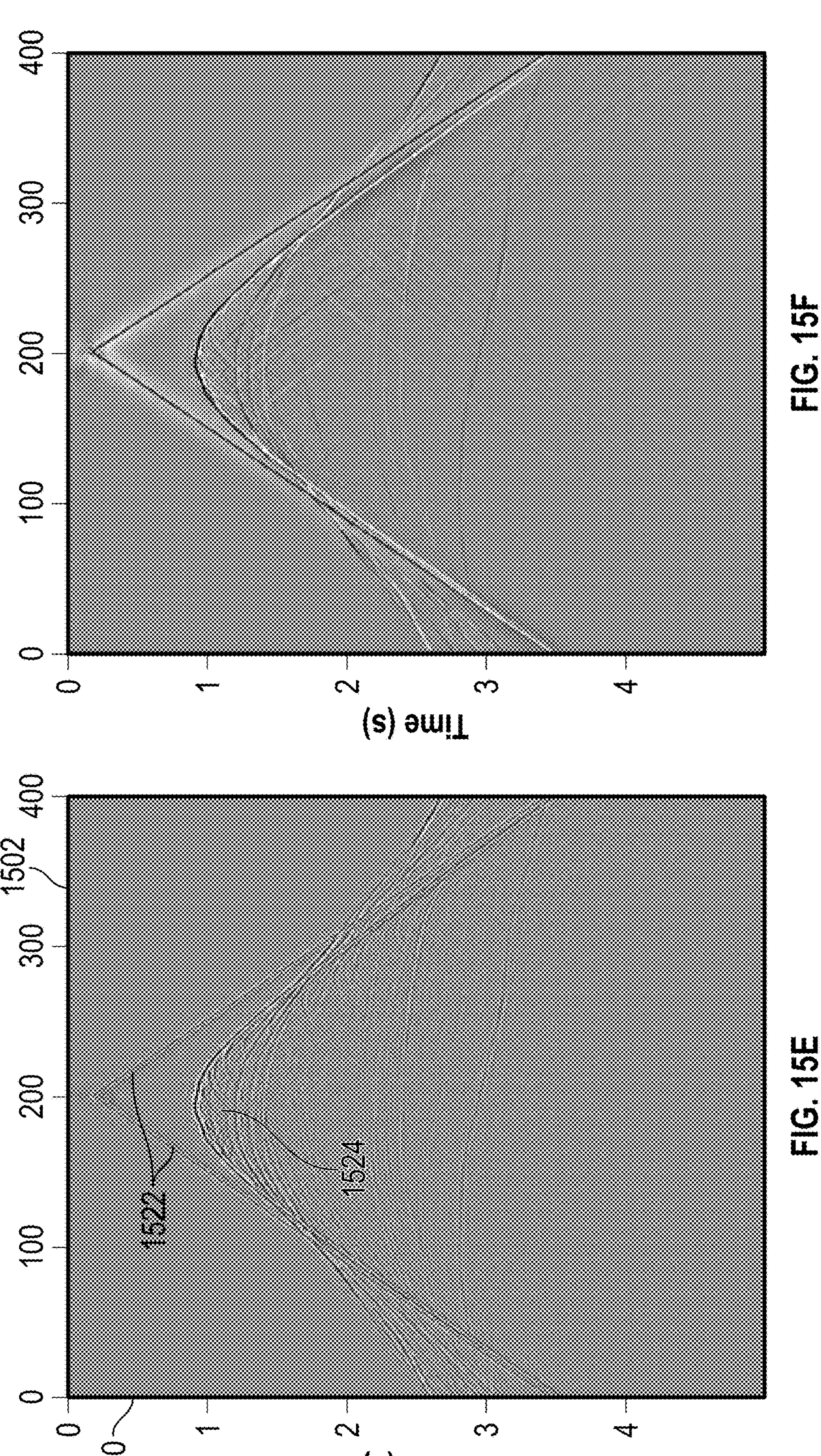
FIGS. 15E and 15F show synthetic seismic data in accordance with one or more embodiments.

FIG. 15E shows a portion synthetic seismic data generated by numerical simulation from the true velocity model (1502). The horizontal axis (1502) indicates the horizontal position of the simulated seismic receivers, while the vertical axis (1520) indicates recording time after the activation of the seismic source located at the center or horizontal axis (1502). The radiated seismic waves (1522) can be seen propagating away from the seismic source and the reflected seismic waves (1524) can be propagating back up from below the seismic source.

FIG. 15C depicts the convention FWI velocity model (1514) resulting from applying conventional FWI, starting with the starting velocity model (1512), to the synthetic seismic data, a portion of which is shown in FIG. 15E. While the convention FWI velocity model (1514) indicates more detailed structure in the recovered velocity model than in the starting velocity model (1512), much of that structure does not match the structure of the true velocity model (1512). For example, there is a poor correlation between the velocity within the ellipse (1530) in the true velocity model (1512) and in the convention FWI velocity model (1514).

In contrast, FIG. 15F shows a portion synthetic seismic data generated by numerical simulation from the true velocity model (1512) and after the application of Blocks (1202) through (1212), inclusive, of FIG. 12. That is, FIG. 15F results from applying Blocks (1202) through (1212), inclusive for the synthetic data shown in FIG. 15E. A visual inspection by a person of ordinary skill in the art will make it readily apparent that the synthetic seismic data in FIG. 15F contains much larger low frequency components than the synthetic seismic data in FIG. 15E.

FIG. 15D depicts the FWI velocity model (1516) resulting from applying conventional FWI, starting with the starting velocity model (1512), to the synthetic seismic data after low-frequency bandwidth extension, a portion of which is shown in FIG. 15F. It will be apparent to a person of ordinary skill in the art that the structure within the FWI velocity model (1516) is much more similar to structure within the true velocity model (1510). For example, there is a better correlation between the velocity within the ellipse (1530) in the true velocity model (1512) and in the FWI velocity model (1516) than between the true velocity model (1512) and the conventional FWI convention FWI velocity model (1514).

Finally, it is noted that in real seismic data the temporal frequency bandwidth is not stationary or constant for all events. Due to absorption of the wave energy in the subsurface, the frequency content is reduced with two-way travel time and the frequency bandwidth of later primary reflection arrivals is always less than that of earlier arrivals. In the case of marine seismic acquisition, multiple reverberations travelling in the water layer will show broader bandwidth than subsurface reflections with the same arrival time, since the former experience much less absorption than the latter. Therefore, if one desires to modify the temporal frequency content of the seismic data via spectral shaping, such a process would require designing different shaping filters for different times and separate events such as primaries and multiples prior to bandwidth enhancement. This is due to the fact that a shaping filter transforms a given input spectrum to a given output spectrum by multiplying the amplitude at each frequency in the input data such that it becomes the desired value. To deal with time-varying spectral bandwidth, time-varying filtering is performed by defining overlapping windows in which different filters are applied.

With the methods disclosed herein, the machine-learned model can be applied to any kind of seismic data, whether it has a constant bandwidth or a time-varying bandwidth. Such an application is not feasible with conventional shaping filters, even with time-varying filtering because shaping filters are derived for a particular input-output pair of spectra. As such, embodiments disclosed herein are advantageous over currently employed methods in the literature. Thus, the embodiments disclosed herein provide an improvement over existing processes for achieving the same goal.

Figure 16:
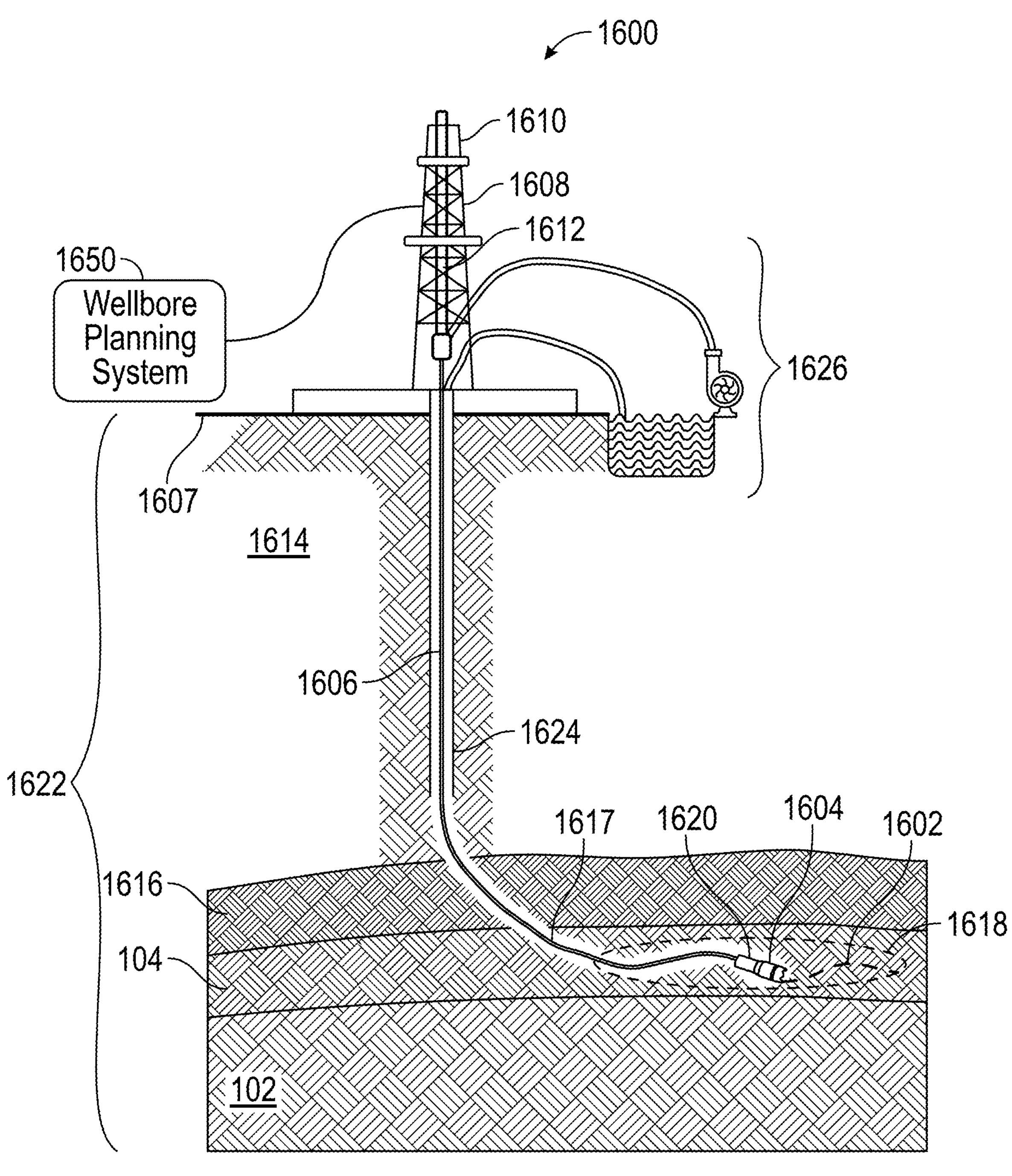
FIG. 16 depicts a drilling system in accordance with one or more embodiments.

FIG. 16 shows a drilling system (1600) in accordance with one or more embodiments. Although the drilling system (1600) shown in FIG. 16 is used to drill a wellbore on land, the drilling system (1600) may also be a marine wellbore drilling system. The example of the drilling system (1600) shown in FIG. 16 is not meant to limit the present disclosure.

As shown in FIG. 16, a wellbore path (1602) may be drilled by a drill bit (1604) attached by a drillstring (1606) to a drill rig located on the surface (1607) of the earth. The drill rig may include framework, such as a derrick (1608) to hold drilling machinery. The top drive (1610) sits at the top of the derrick (1608) and provides torque, typically a clockwise torque, via the drive shaft (1612) to the drillstring (1606) in order to drill the wellbore. The wellbore may traverse a plurality of overburden (1614) layers and one or more cap-rock (1616) layers to a hydrocarbon reservoir (104) within the subterranean region of interest (102). In accordance with one or more embodiments, the extended bandwidth seismic dataset may be used to plan a wellbore including a wellbore path (1602) and drill a wellbore (1617) guided by the wellbore path (1602). The wellbore path (1602) may be a curved wellbore path, or a straight wellbore path. All or part of the wellbore path (1602) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the target zone (1618), e.g., a targeted hydrocarbon-bearing formation, and a planned wellbore path (1602) from the starting location to the terminal location. In other words, the wellbore path (1602) may intersect a previously located hydrocarbon reservoir (104).

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. In accordance with one or more embodiments, the wellbore plan is informed by an extended bandwidth seismic dataset produced using the machine-learned model (304) applied to a seismic dataset (302) acquired through a seismic survey (100) conducted over the subterranean region of interest (102).

The wellbore plan may include wellbore geometry information such as wellbore diameter and inclination angle. If casing (1624) is used, the wellbore plan may include casing type or casing depths. Furthermore, the wellbore plan may consider other engineering constraints such as the maximum wellbore curvature ("dog-log") that the drillstring (1606) may tolerate and the maximum torque and drag values that the drilling system (1600) may tolerate.

A wellbore planning system (1650) may be used to generate the wellbore plan. The wellbore planning system (1650) may comprise one or more computer processors in communication with computer memory containing the geophysical and geomechanical models, the extended bandwidth seismic dataset, information relating to drilling hazards, and the constraints imposed by the limitations of the drillstring (1606) and the drilling system (1600). The wellbore planning system (1650) may further include dedicated software to determine the planned wellbore path (1602) and associated drilling parameters, such as the planned wellbore diameter, the location of planned changes of the wellbore diameter, the planned depths at which casing (1624) will be inserted to support the wellbore and to prevent formation fluids entering the wellbore, and the drilling mud weights (densities) and types that may be used during drilling the wellbore.

A wellbore (1617) may be drilled using a drill rig that may be situated on a land drill site, an offshore platform, such as a jack-up rig, a semi-submersible, or a drill ship. The drill rig may be equipped with a hoisting system, such as a derrick (1608), which can raise or lower the drillstring (1606) and other tools required to drill the well. The drillstring (1606) may include one or more drill pipes connected to form conduit and a bottom hole assembly (BHA) (1620) disposed at the distal end of the drillstring (1606). The BHA (1620) may include a drill bit (1604) to cut into subsurface (1622) rock. The BHA (1620) may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore (1617). Both MWD and LWD measurements may be transmitted to the surface (1607) using any suitable telemetry system, such as mud-pulse or wired-drill pipe, known in the art.

To start drilling, or "spudding in" the well, the hoisting system lowers the drillstring (1606) suspended from the derrick (1608) towards the planned surface location of the wellbore (1617). An engine, such as a diesel engine, may be used to supply power to the top drive (1610) to rotate the drillstring (1606). The weight of the drillstring (1606) combined with the rotational motion enables the drill bit (1604) to bore the wellbore.

The near-surface is typically made up of loose or soft sediment or rock, so large diameter casing (1624), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (1607) of the earth.

Drilling may continue without any casing (1624) once deeper, or more compact rock is reached. While drilling, a drilling mud system (1626) may pump drilling mud from a mud tank on the surface (1607) through the drill pipe. Drilling mud serves various purposes, including pressure equalization, removal of rock cuttings, and drill bit cooling and lubrication.

At planned depth intervals, drilling may be paused and the drillstring (1606) withdrawn from the wellbore. Sections of casing (1624) may be connected and inserted and cemented into the wellbore. Casing string may be cemented in place by pumping cement and mud, separated by a "cementing plug," from the surface (1607) through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system (1600) may be disposed at and communicate with other systems in the well environment. The drilling system (1600) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a target zone (1618) is reached, or the presence of hydrocarbons is established.

Figure 17:
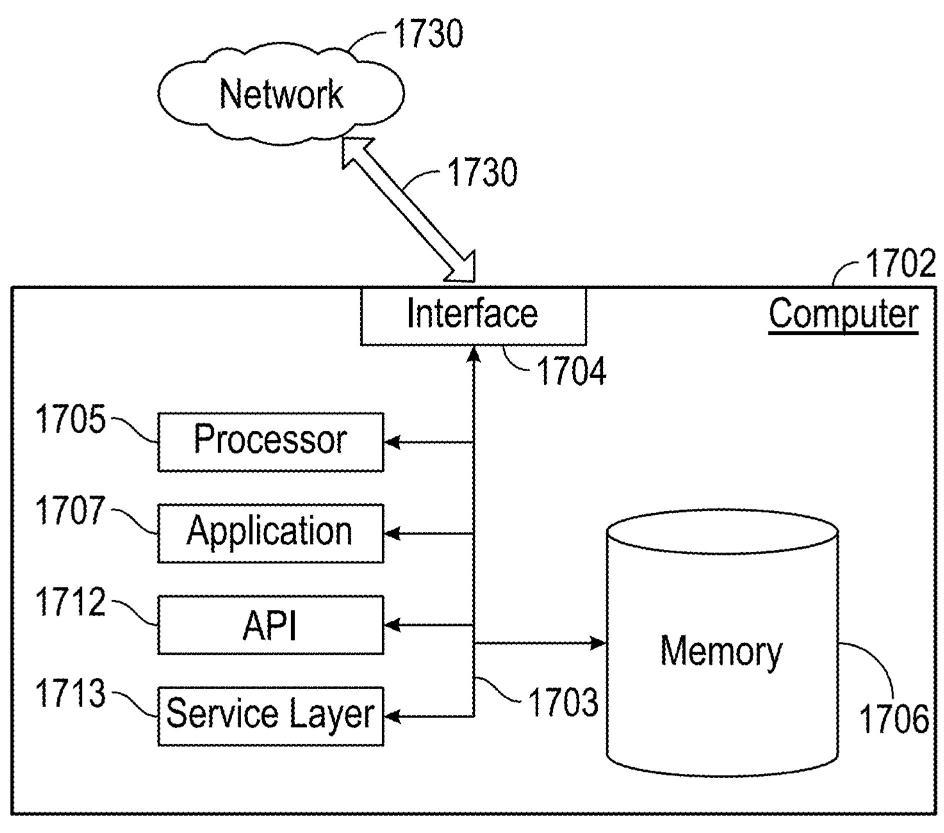
FIG. 17 depicts a system in accordance with one or more embodiments.

FIG. 17 further depicts a block diagram of a computer system (1702) used to provide computational functionalities associated with the methods, functions, processes, flows, and procedures as described in this disclosure, according to one or more embodiments. The illustrated computer (1702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1702) may include a computer that includes an input device, such as a keypad, keyboard, touch screen, or other device that can accept user information, and an output device that conveys information associated with the operation of the computer (1702), including digital data, visual, or audio information (or a combination of information), or a GUI.

The computer (1702) can serve in a role as a client, network component, a server, a database or other persistency, or any other component (or a combination of roles) of a computer system for performing the subject matter described in the instant disclosure. In some implementations, one or more components of the computer (1702) may be configured to operate within environments, including cloud-computing-based, local, global, or other environment (or a combination of environments).

At a high level, the computer (1702) is an electronic computing device operable to receive, transmit, process, store, or manage data and information associated with the described subject matter. According to some implementations, the computer (1702) may also include or be communicably coupled with an application server, e-mail server, web server, caching server, streaming data server, business intelligence (BI) server, or other server (or a combination of servers).

The computer (1702) can receive requests over network (1730) from a client application (for example, executing on another computer (1702) and responding to the received requests by processing the said requests in an appropriate software application. In addition, requests may also be sent to the computer (1702) from internal users (for example, from a command console or by other appropriate access method), external or third-parties, other automated applications, as well as any other appropriate entities, individuals, systems, or computers.

Each of the components of the computer (1702) can communicate using a system bus (1703). In some implementations, any or all of the components of the computer (1702), both hardware or software (or a combination of hardware and software), may interface with each other or the interface (1704) (or a combination of both) over the system bus (1703) using an application programming interface (API) (1712) or a service layer (1713) (or a combination of the API (1712) and service layer (1713). The API (1712) may include specifications for routines, data structures, and object classes. The API (1712) may be either computer-language independent or dependent and refer to a complete interface, a single function, or even a set of APIs. The service layer (1713) provides software services to the computer (1702) or other components (whether or not illustrated) that are communicably coupled to the computer (1702). The functionality of the computer (1702) may be accessible for all service consumers using this service layer. Software services, such as those provided by the service layer (1713), provide reusable, defined business functionalities through a defined interface. For example, the interface may be software written in JAVA, C++, or other suitable language providing data in extensible markup language (XML) format or another suitable format. While illustrated as an integrated component of the computer (1702), alternative implementations may illustrate the API (1712) or the service layer (1713) as stand-alone components in relation to other components of the computer (1702) or other components (whether or not illustrated) that are communicably coupled to the computer (1702). Moreover, any or all parts of the API (1712) or the service layer (1713) may be implemented as child or sub-modules of another software module, enterprise application, or hardware module without departing from the scope of this disclosure.

The computer (1702) includes an interface (1704). Although illustrated as a single interface (1704) in FIG. 17, two or more interfaces (1704) may be used according to particular needs, desires, or particular implementations of the computer (1702). The interface (1704) is used by the computer (1702) for communicating with other systems in a distributed environment that are connected to the network (1730). Generally, the interface (1704) includes logic encoded in software or hardware (or a combination of software and hardware) and operable to communicate with the network (1730). More specifically, the interface (1704) may include software supporting one or more communication protocols associated with communications such that the network (1730) or interface's hardware is operable to communicate physical signals within and outside of the illustrated computer (1702).

The computer (1702) includes at least one computer processor (1705). Although illustrated as a single computer processor (1705) in FIG. 17, two or more processors may be used according to particular needs, desires, or particular implementations of the computer (1702). Generally, the computer processor (1705) executes instructions and manipulates data to perform the operations of the computer (1702) and any algorithms, methods, functions, processes, flows, and procedures as described in the instant disclosure.

The computer (1702) also includes a memory (1706) that holds data for the computer (1702) or other components (or a combination of both) that can be connected to the network (1730). The memory may be a non-transitory computer readable medium. For example, memory (1706) can be a database storing data consistent with this disclosure. Although illustrated as a single memory (1706) in FIG. 17, two or more memories may be used according to particular needs, desires, or particular implementations of the computer (1702) and the described functionality. While memory (1706) is illustrated as an integral component of the computer (1702), in alternative implementations, memory (1706) can be external to the computer (1702).

The application (1707) is an algorithmic software engine providing functionality according to particular needs, desires, or particular implementations of the computer (1702), particularly with respect to functionality described in this disclosure. For example, application (1707) can serve as one or more components, modules, applications, etc. Further, although illustrated as a single application (1707), the application (1707) may be implemented as multiple applications (1707) on the computer (1702). In addition, although illustrated as integral to the computer (1702), in alternative implementations, the application (1707) can be external to the computer (1702).

There may be any number of computers (1702) associated with, or external to, a computer system containing computer (1702), wherein each computer (1702) communicates over network (1730). Further, the term "client," "user," and other appropriate terminology may be used interchangeably as appropriate without departing from the scope of this disclosure. Moreover, this disclosure contemplates that many users may use one computer (1702), or that one user may use multiple computers (1702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:

collecting a seismic dataset from a seismic survey conducted over a subterranean region of interest;

generating a plurality of synthetic datasets, wherein each synthetic dataset comprises an input seismic dataset with a first bandwidth and an associated target seismic dataset with a second bandwidth, wherein the second bandwidth is broader, by extending to lower frequencies, than the first bandwidth, wherein generating a given synthetic dataset of the plurality of synthetic datasets comprises:

obtaining, for the given synthetic dataset, synthetic data generation parameters, initializing a time domain as a collection of traces organized according to a simulated location and aligned along a time axis, each trace initialized with a value of zero or a random value at each time comprised by the time axis, determining, using the synthetic data generation parameters, a number of events to be superimposed into the time domain, for each event:

determining, using the data generation parameters, a geometric shape, shape parameters, and an event location; and superimposing the event into the time domain by altering the value of each trace at each time that intersects the event based on the geometric shape, shape parameters, and event location, obtaining, from the data generation parameters, wavelet parameters comprising:

a first parameter set that defines a first wavelet; and a second parameter set that defines a second wavelet, the second wavelet being associated with lower frequency content relative to the first wavelet, duplicating the time domain to form a first time domain and a second time domain, convolving the traces of the first time domain with the first wavelet to form an input seismic dataset of the given synthetic dataset, and convolving the traces of second time domain with the second wavelet to form a target seismic dataset of the given synthetic dataset;

splitting the plurality of synthetic datasets into a training set;

selecting a first machine-learned model with a first architecture;

training the first machine-learned model using the training set, wherein the first machine-learned model is trained to receive the seismic dataset and output another seismic dataset with extended bandwidth relative to the seismic dataset;

using the first machine-learned model to produce an extended bandwidth seismic dataset from the seismic dataset;

determining a location of a hydrocarbon reservoir in the subterranean region of interest using the extended bandwidth seismic dataset;

planning a wellbore to penetrate the hydrocarbon reservoir based on the location, wherein the planned wellbore comprises a planned wellbore path; and drilling the wellbore guided by the planned wellbore path.

2. The method of claim 1, further comprising:

splitting the plurality of synthetic datasets into a validation set;

evaluating the first machine-learned model on the validation set;

selecting a second machine-learned model with a second architecture;

training the second machine-learned model using the training set;

evaluating the second machine-learned model on the validation set; and identifying which machine-learned model, of the first and second machine-learned models, has a superior performance as evaluated on the validation set.

3. The method of claim 1, further comprising:

splitting the plurality of synthetic datasets into a test set; and estimating a machine-learned model generalization error using the test set.

4. The method of claim 1, further comprising:

applying an amplitude function to each event in each synthetic dataset;

applying random noise to each synthetic dataset; and applying static perturbations to each synthetic data set.

5. The method of claim 1, wherein the machine-learned model is a convolutional neural network.

6. The method of claim 1, further comprising:

pre-processing the seismic dataset, wherein pre-processing comprises:

regularizing the seismic dataset, and applying a move-out correction to the seismic dataset.

7. The method of claim 1, wherein generating the given synthetic dataset of the plurality of synthetic datasets further comprises:

adding noise to the given synthetic dataset.

8. The method of claim 1, wherein the first wavelet and the second wavelet are each an Ormsby wavelet;

wherein the first parameter set and the second parameter each comprise a first corner frequency, a second corner frequency, a third corner frequency, and a fourth corner frequency;

wherein the first corner frequency of the second parameter is less than the first corner frequency of the first parameter set;

wherein the second corner frequency of the second parameter set is less than the second corner frequency of the first parameter set;

wherein the third corner frequency of the second parameter set is equal to the third corner frequency of the first parameter set; and wherein the fourth corner frequency of the second parameter set is equal to the fourth corner frequency of the first parameter set.

9. A system, comprising:

a drilling system configured to drill a wellbore guided by a wellbore plan; and a computer configured to:

receive a seismic dataset, generate a plurality of synthetic datasets, wherein each synthetic dataset comprises an input seismic dataset with a first bandwidth and an associated target seismic dataset with a second bandwidth, wherein the second bandwidth is broader, by extending to higher frequencies, than the first bandwidth wherein generating a given synthetic dataset of the plurality of synthetic datasets comprises:

obtaining, for the given synthetic dataset, synthetic data generation parameters, initializing a time domain as a collection of traces organized according to a simulated location and aligned along a time axis, each trace initialized with a value of zero or a random value at each time comprised by the time axis;

determining, using the synthetic data generation parameters, a number of events to be superimposed into the time domain;

for each event:

determining, using the data generation parameters, a geometric shape, shape parameters, and an event location, and superimposing the event into the time domain by altering the value of each trace at each time that intersects the event based on the geometric shape, shape parameters, and event location;

obtaining, from the data generation parameters, wavelet parameters comprising:

a first parameter set that defines a first wavelet; and a second parameter set that defines a second wavelet, the second wavelet being associated with lower frequency content relative to the first wavelet, duplicating the time domain to form a first time domain and a second time domain, convolving the traces of the first time domain with the first wavelet to form an input seismic dataset of the given synthetic dataset, and convolving the traces of second time domain with the second wavelet to form a target seismic dataset of the given synthetic dataset;

split the plurality of synthetic datasets into a training set, train a machine-learned model using the training set, wherein the machine-learned model is trained to receive the seismic dataset and output another seismic dataset with extended bandwidth relative to the seismic dataset, use the trained machine-learned model to produce an extended bandwidth seismic dataset from the seismic dataset, and construct the wellbore plan using the extended bandwidth seismic dataset.

10. The system of claim 9, wherein the trained machine-learned model is a convolutional neural network.

11. The system of claim 9, wherein the computer is further configured to:

pre-process the seismic dataset, wherein pre-processing comprises:

regularizing the seismic dataset, and applying a move-out correction to the seismic dataset.

* * * * *